(12) United States Patent
Hodge et al.

(10) Patent No.: US 9,595,380 B2
(45) Date of Patent: Mar. 14, 2017

(54) FAULT CURRENT LIMITER

(75) Inventors: Eoin Patrick Hodge, New South Wales (AU); Francis Anthony Darmann, New South Wales (AU)

(73) Assignee: ASG SUPERCONDUCTORS S.p.A., Genoa (IT)

( * ) Notice: Subject to any disclaimer, the term of this patent is extended or adjusted under 35 U.S.C. 154(b) by 8 days.

(21) Appl. No.: 14/406,824

(22) PCT Filed: Jun. 12, 2012

(86) PCT No.: PCT/AU2012/000674
§ 371 (c)(1),
(2), (4) Date: Dec. 10, 2014

(87) PCT Pub. No.: WO2012/167331
PCT Pub. Date: Dec. 13, 2012

(65) Prior Publication Data
US 2015/0248962 A1 Sep. 3, 2015

(51) Int. Cl.
| | | |
|---|---|---|
| *H01F 17/04* | (2006.01) |
| *H01F 27/28* | (2006.01) |
| *H01F 27/24* | (2006.01) |
| *H01F 38/02* | (2006.01) |
| *H02H 9/02* | (2006.01) |
| *H01F 29/14* | (2006.01) |

(Continued)

(52) U.S. Cl.
CPC ............. *H01F 27/24* (2013.01); *H01F 29/14* (2013.01); *H01F 38/023* (2013.01); *H02H 9/02* (2013.01); *H01F 2003/103* (2013.01); *H01F 2006/001* (2013.01); *H01F 2029/143* (2013.01)

(58) Field of Classification Search
CPC .......... H01F 27/24; H01F 27/28; H01F 27/23; H01F 27/288; H01F 27/36; H01F 27/365; H01F 27/367; H01F 38/023; H01F 2003/103; H01F 3/02; H01F 3/04; H02H 9/02
USPC ........... 336/221, 58, 94, 110, 170, 214, 234, 336/84 M, 84 C
See application file for complete search history.

(56) References Cited

U.S. PATENT DOCUMENTS

| | | | |
|---|---|---|---|
| 3,611,224 A | * | 10/1971 | Becker .................. H01F 27/385 323/206 |
| 7,193,825 B2 | | 3/2007 | Darmann et al. |
| 7,551,410 B2 | | 6/2009 | Darmann |

FOREIGN PATENT DOCUMENTS

| | | | |
|---|---|---|---|
| JP | 2004-022913 A | * | 1/2004 |
| JP | 2004022913 A | | 1/2004 |
| WO | 2009/121143 A1 | | 8/2009 |

OTHER PUBLICATIONS

Kozak et al, Physical and Numerical Models of Superconducting Fault Current Limiters, IEEE Transactions on Applied Superconductivity, vol. 13, No. 2, Jun. 2003.

(Continued)

*Primary Examiner* — Mangtin Lian
(74) *Attorney, Agent, or Firm* — Robert S. Babayi; Vector IP Law Group

(57) ABSTRACT

A fault current limiter of the type having at least one elongated core biased magnetically towards saturation by means of a surrounding magnetic field, and an AC coil surrounding the core, the fault current limiter including: an elongated core having a variable cross section along the axis of the core in the vicinity of the AC coil, providing increased saturation of the core and enhanced fault current limiting for a lower DC bias.

10 Claims, 24 Drawing Sheets

(51) Int. Cl.
*H01F 3/10* (2006.01)
*H01F 6/00* (2006.01)

(56) References Cited

OTHER PUBLICATIONS

Patent Cooperation Treaty International Search Report, PCT/AU2012/000674, Jun. 2012.
Patent Cooperation Treaty Written Opinion of the International Searching Authority, PCT/AU2012/000674, Jun. 2012.

* cited by examiner

FAULT CURRENT LIMITER

FIELD OF THE INVENTION

The present invention relates to current limiting and in particular to a fault current limiter (FCL) of the saturated magnetic core type.

BACKGROUND

Any discussion of the background art throughout the specification should in no way be considered as an admission that such art is widely known or forms part of common general knowledge in the field.

Magnetically saturated core fault current limiters are generally known. For example, see U.S. Pat. Nos. 7,551,410 and 7,193,825. Open core FCLs are known, for example, from PCT Publication WO 2009/121,143. While these FCLs offer efficacious functionality it has been found that their operational characteristics can be substantially improved.

Ideally, any FCL device is made in a simple and compact form.

SUMMARY OF THE INVENTION

It is an object of the present invention to provide a useful alternative FCL having a number of advantageous features.

In accordance with a first aspect of the present invention, there is provided a fault current limiter of the type having at least one elongated core biased magnetically towards saturation by means of a surrounding magnetic field, and an AC coil surrounding the core, the fault current limiter including: an elongated core having a variable cross section along the axis of the core in the vicinity of the AC coil, aiding in the saturation of the core.

In some embodiments, the cross sectional area is enlarged in the vicinity of the AC coil. In other embodiments the cross sectional area experiences a tapering toward the ends of the core. Preferably, where the intensity of the magnetic field varies axially along the elongated core, the axially variable cross section can be larger in the vicinity of the larger intensity of the magnetic field. The magnetic field can be created by at least one DC coil surrounding the core, or by other means including magnetic core end-caps, permanent or otherwise, or DC coils adjacent to the cores.

In some embodiments, two spaced apart DC coils surround the core and the core preferably can include a reduced cross sectional area in the region between the two spaced apart DC coils.

In other embodiments, the number of DC coils can be one and the elongated core preferably can include an enlarged cross sectional area in a first region adjacent the DC coil, a reduced cross sectional area in a second region spaced apart from the DC coil.

In some embodiments, the elongated core further preferably can include an enlarged cross sectional area in a third region at the ends of the elongated core. The enlarge cross section of the third region can be formed from a separate core mass placed at the ends of the elongated cores.

In some embodiments, the limiter has two elongated cores per power phase, with each core spaced apart from one another and having a DC coil surrounding both cores of each phase.

In some embodiments, the cores have substantially a D shaped cross section.

In some embodiments, the number of phases can be three and the number of cores can be six, with the cores arranged in a circular or other compact manner.

The cores are preferably formed from laminated high magnetic permability material.

In some embodiments, a magnetic shield can be place around the cores and AC windings. This can be made from an electrically conductive material such as copper or stainless steel.

In accordance with a further aspect of the present invention, there is provided a method of improving the operation of a fault current limiter, the fault current limiter being of a type having at least one elongated core biased magnetically towards saturation by means of a surrounding magnetic field, and an AC coil surrounding the core, the method including the steps of: (a) determining the potential magnetic field along the axis of the elongated core; (b) modifying the cross sectional area along the axis of the core to enhance the operational characteristics of the fault current limiter.

In accordance with a further aspect of the present invention, there is provided a method of improving the operation of a fault current limiter above, wherein the step (b) preferably can include increasing the cross sectional area in areas of high magnetic intensity, reducing the cross sectional area in areas of lower magnetic intensity and increasing the cross sectional area at the ends of the elongated core, whether by taper, step or other geometries.

In accordance with a further aspect of the present invention, there is provided a fault current limiter of the type having at least one core biased magnetically towards saturation during normal operation and an AC current carrying coil around the core, the fault current limiter including: at least one elongated core around which an AC coil is wound, the elongated core including a variable cross section along the length thereof in the vicinity of the AC coil, with the variable cross section being optimized to reduce the strength of the surrounding magnetic field required around the core to induce saturation of the core.

In accordance with a further aspect of the present invention, there is provided a fault current limiter of the type having at least one elongated portion of a core biased magnetically towards saturation by means of a surrounding magnetic field, and an AC coil surrounding the portion of the core, the elongated portion of the core further including a variable cross sectional area along the elongation axis for aiding the operational characteristics of the fault current limiter.

BRIEF DESCRIPTION OF THE DRAWINGS

Preferred embodiments of the invention will now be described, by way of example only, with reference to the accompanying drawings in which.

DETAILED DESCRIPTION

In the preferred embodiment, the cross section of the steel core along the length of the Fault Current Limiter is optimised to provide improved fault current limiting effects. Through experimentation it has been found that the magnetic field intensity required is substantially lowered. This applies to both three phase devices or to single phase devices. It has been further found that through optimising the core cross sectional area, the core can be shorter than required by the traditional design approach of using a core with a constant cross sectional area.

Altering the cross sectional area of the steel core along the core's length in a defined manner allows the steel core to be biased with less ampere turns (for example, 500 kAT compared to 710 kAT for one design) and it can be de-biased with less available fault ampere-turns. This is especially useful in designs where the field specification has very little prospective fault current.

Figure 1:
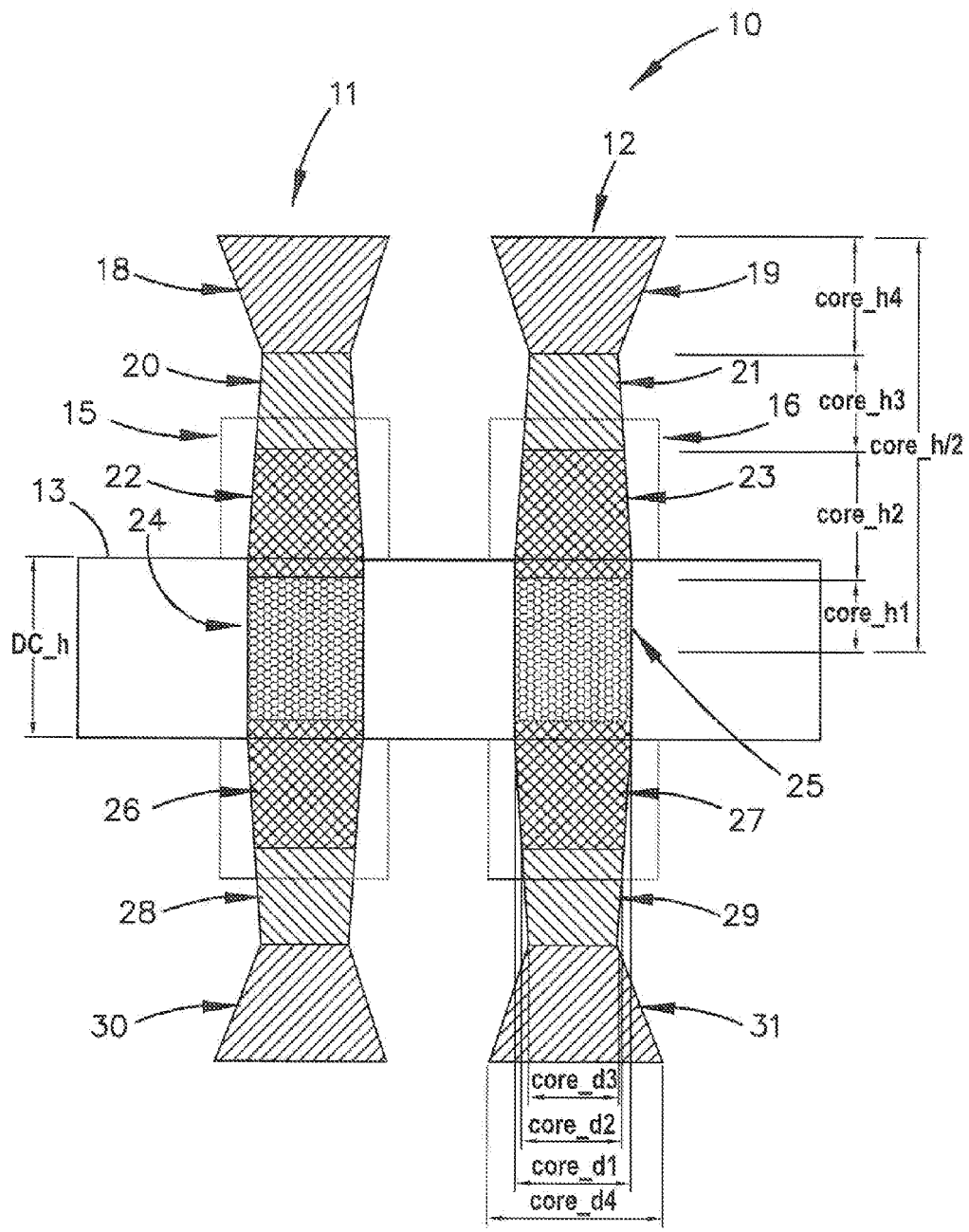
FIG. 1 illustrates a schematic sectional view through a first single phase fault current limiter.

Turning initially to FIG. 1, there is illustrated a sectional view through the operative portions of a single phase fault current limiter 10. The fault current limiter includes two cores 11, 12 formed from laminated steel. The cores 11, 12 are shaped to maximise the magnetic saturation of the cores provided by a surrounding DC coil 13. The cores 11, 12 also support surrounding AC coils 15, 16 which are interconnected (not shown) and electrically connected in an opposite sense so as to provide fault coverage of alternate half cycles of a fault.

The utilisation of a single DC coil 13 suggests the corresponding symmetric core structure. In this instance the core structure is made up of top tapered portions 18, 19, portions 20, 21, further portions 22, 23, middle portions 24, 25 and lower portions 26-31 which are symmetrical with the upper portions. FIG. 1 also illustrates various measurement sizes.

Figure 2:
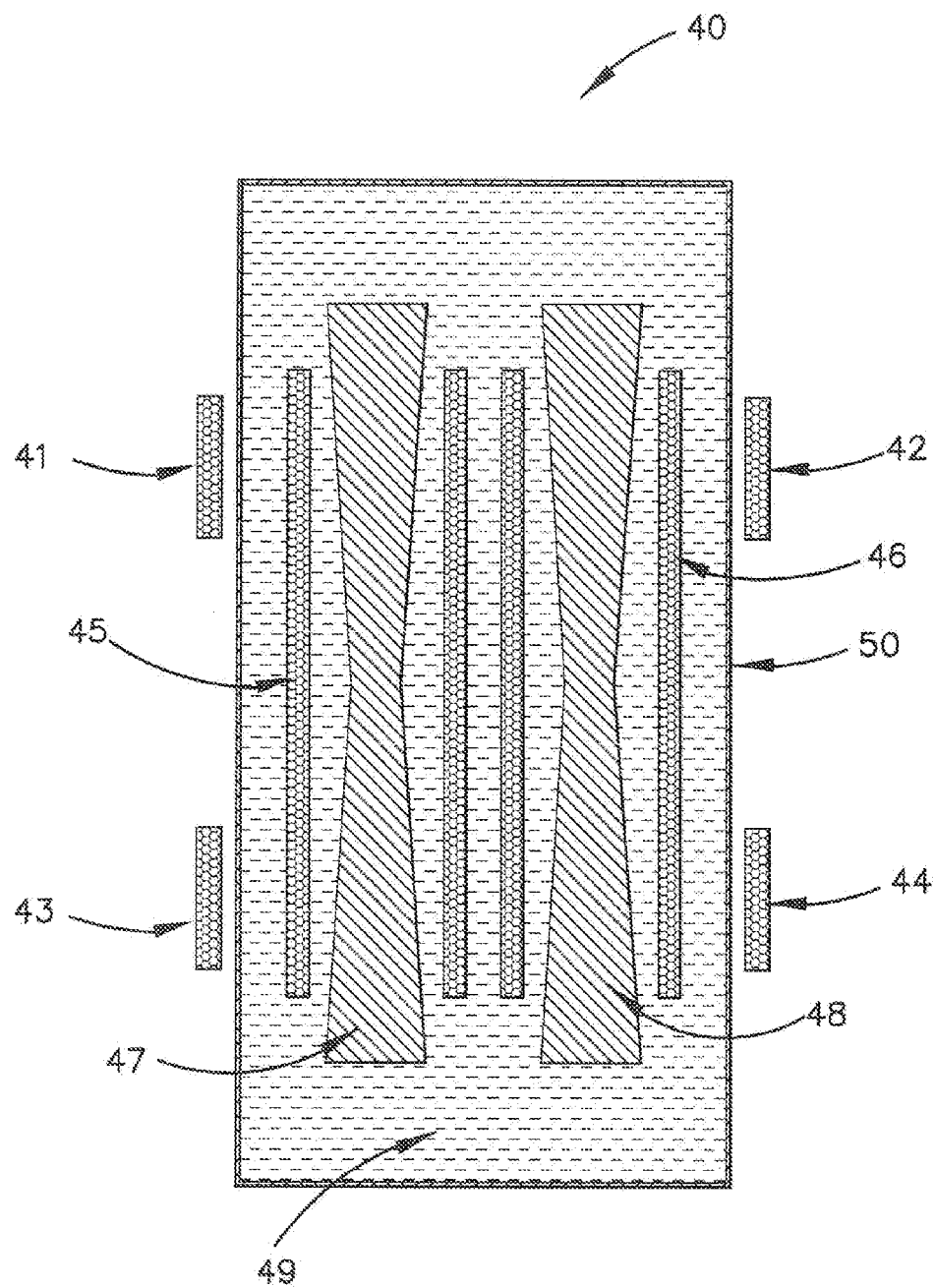
FIG. 2 illustrates a schematic sectional view through a second fault current limiter.

FIG. 2 illustrates a sectional view through an alternative tapered core arrangement. In this example, there is provided two DC coils 41, 42 and 43, 44 for biasing the cores 47, 48. The positioning of the DC coils results in the cores having a thinner waist then the extremities. Around each core 47, 48, is wound a corresponding AC coil 45, 46. The coils are formed within a tank 50 which is filled with transformer oil 49 and is able to handle high voltages without breakdown.

Figure 3:
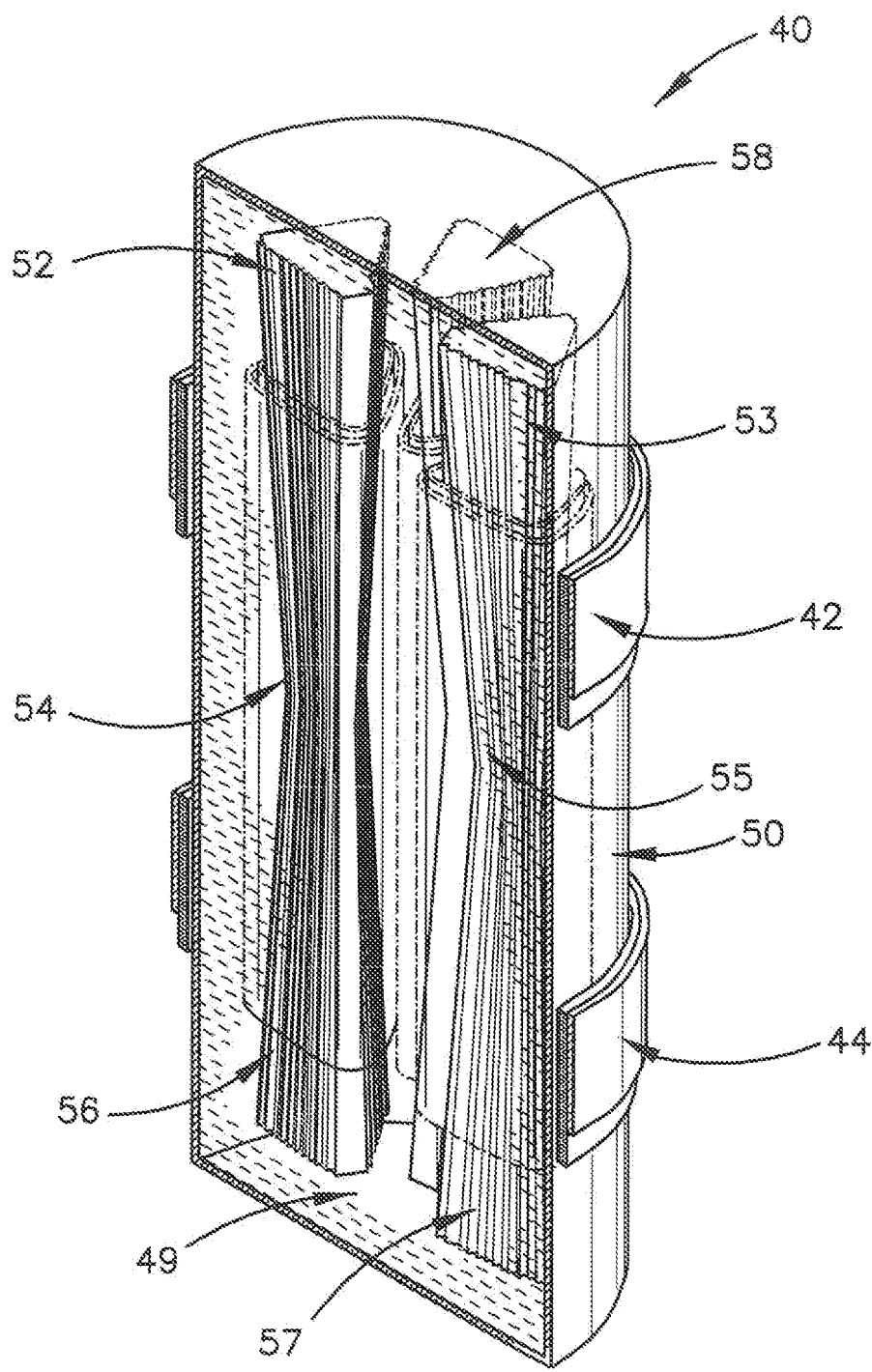
FIG. 3 is a side perspective view of a multiphase fault current limiter similar to that depicted in FIG. 2.

FIG. 3 illustrates a side perspective view in section of the arrangement of FIG. 2 illustrating more clearly half of a symmetric three phase arrangement 40. The sectioned half is symmetric. The three cores 52, 53 are each of a tapered form symmetric around a thinner waist portion e.g. 54 and thicker end portions e.g. 52, 56. Two DC coils 42, 44 surround the external surface of tank 50 for saturating the cores. Further each core as an AC coil wrapped around it (shown in phantom). The arrangement 40 is formed in a tank filled with transformer fluid 49. The cores can be formed from laminated steel sheets cut as required and bonded together.

Figure 4:
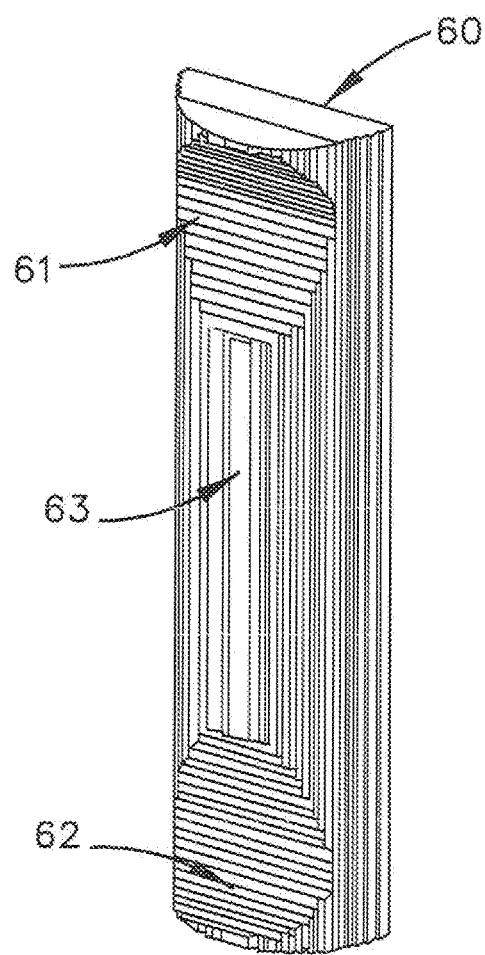
FIG. 4 illustrates a side perspective view of an alternative core of a single phase fault current limiter.
Figure 5:
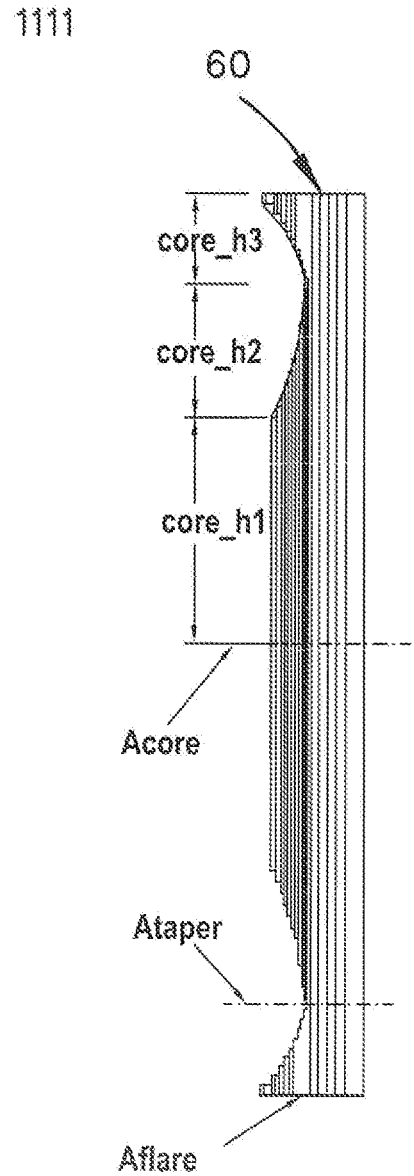
FIG. 5 illustrates a side plan view of the core of FIG. 4 illustrating various core measurements.

FIG. 4 illustrates a further more complex profiled core of a dual core arrangement. In this core, the cross section is generally of a 'D' shape with two thinned portions 61, 62. The central portion 63 is thicker, having a full D shaped cross section. The core is formed from laminated, specially cut steel strips. FIG. 5 illustrates a side plan view of the core 60, illustrating core measurements.

FIG. 5 illustrates the incorporation of the cores of FIG. 4 into a single phase arrangement 70 having two 'D' shaped cores 71, 72. The cores have AC coils wrapped around them e.g. 73 and two DC coils 74, 75 are provided for saturating the cores. The cores include scalloped portions 77, 76 which break's the axial symmetry of the cores in accordance with the teachings of the present invention.

Figure 7:
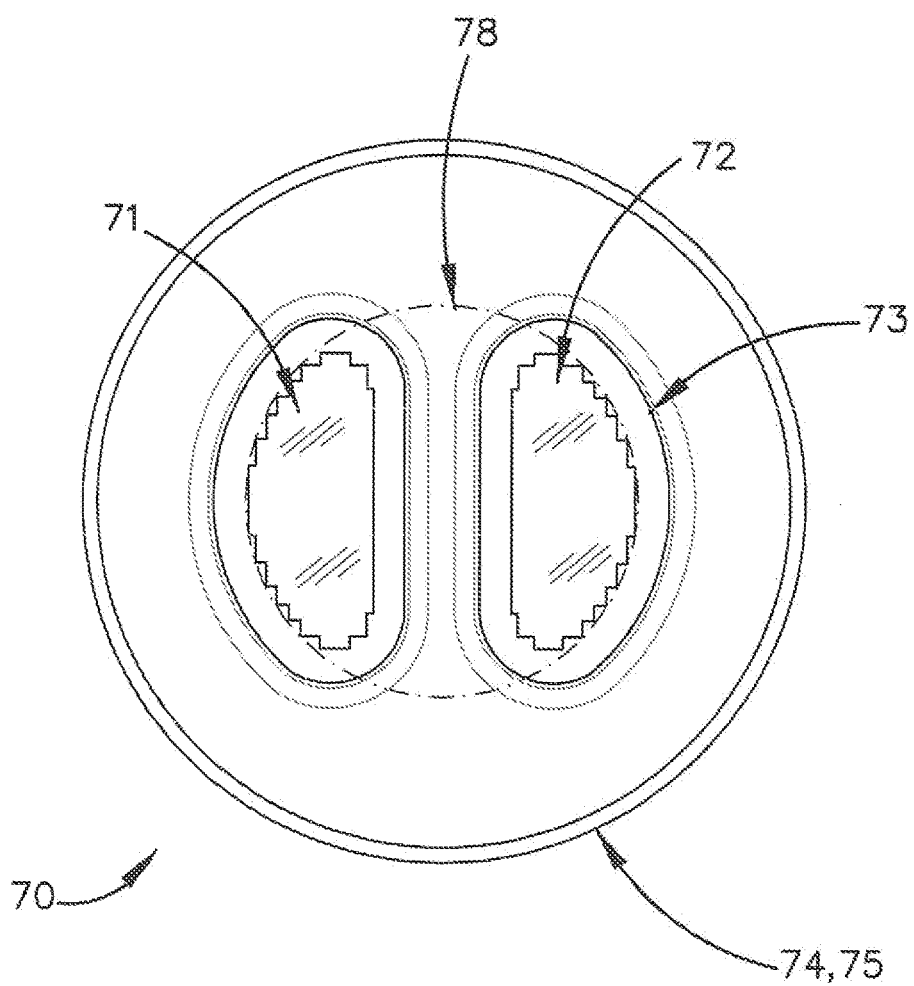
FIG. 7 is a top plan view of the arrangement of FIG. 6.

FIG. 7 illustrates a top plan view of the arrangement 70 of FIG. 5, with the two 'D' shaped cores being formed on the perimeter of circle 78. Around each core is formed an AC coil e.g. 73, with the DC coils 74, 75 providing saturation.

Figure 8:
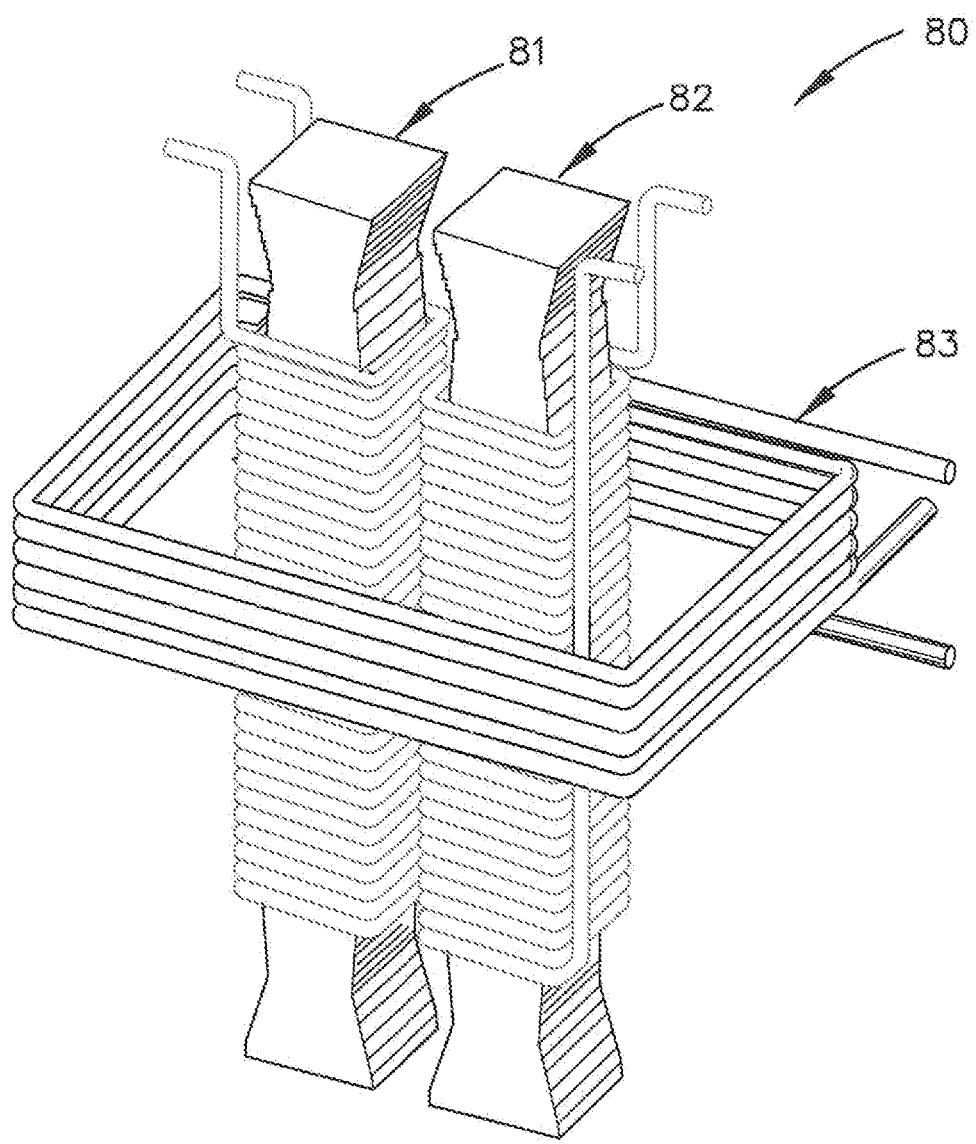
FIG. 8 is a side perspective view of a further alternative single phase FCL arrangement.
Figure 9:
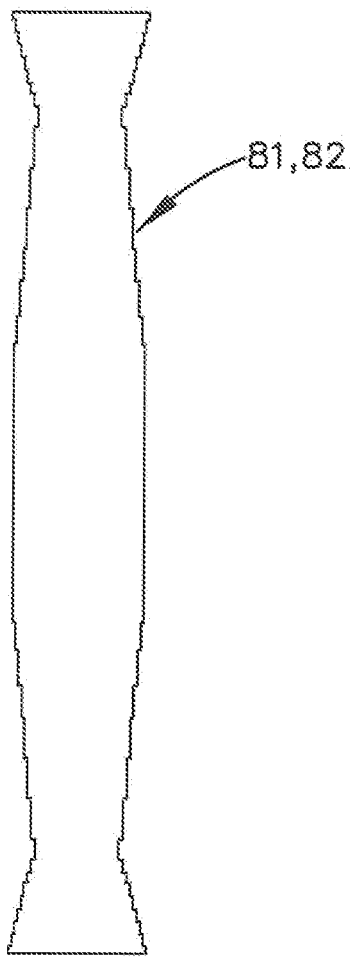
FIG. 9 illustrates an outline view of the core of FIG. 8.
Figure 10:
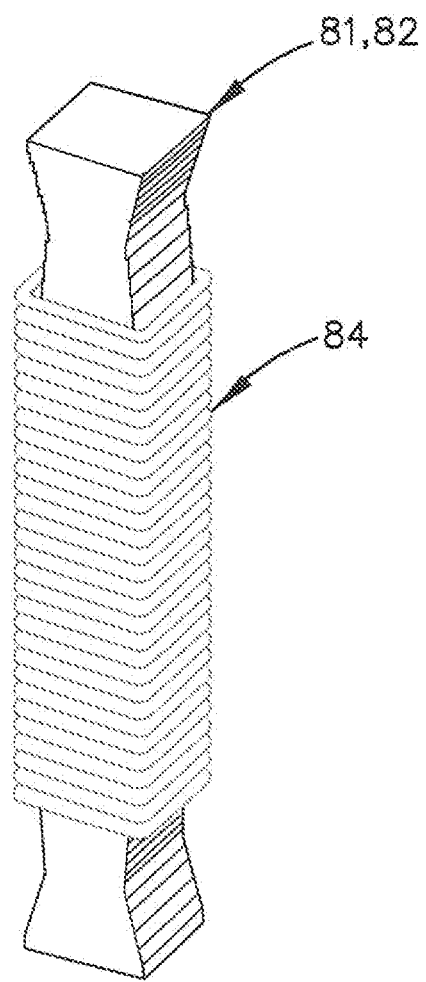
FIG. 10 is a side perspective view of the core and wound AC coil of the arrangement of FIG. 8.

Other core arrangements are possible and will be specification design driven. For example, FIG. 8 illustrates a prototype arrangement 80 where only one DC coil is provided. In this arrangement 80, the cores 81, 82 have an expanded waist portion around which the DC coil 83 is provided for enhanced saturation. The cores 81, 82 also include thicker top and bottom ends. FIG. 9 illustrates an overall outline plan of the cores 81, 82, with FIG. 10 illustrating the AC winding around a core.

Figure 11:
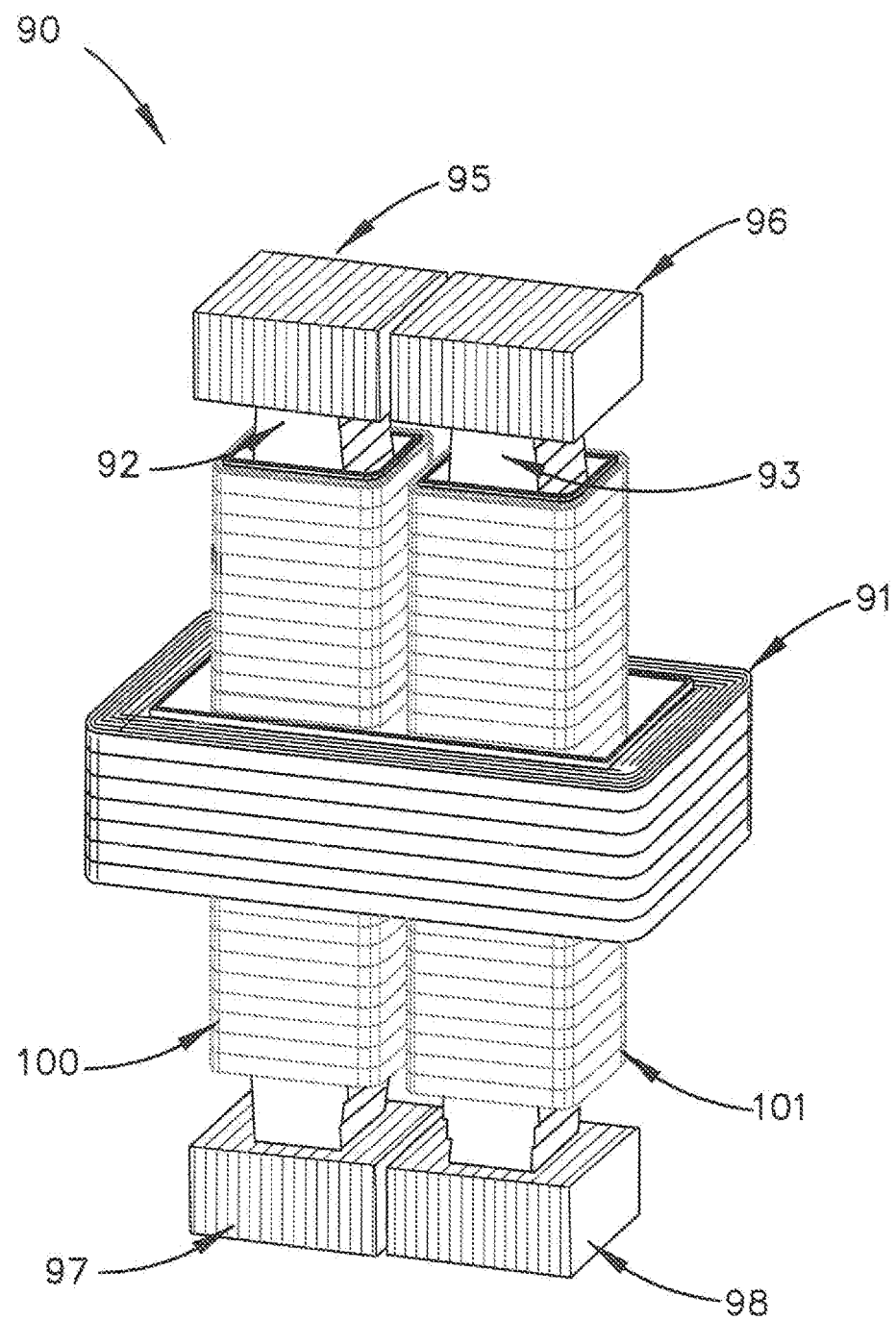
FIG. 11 is a side perspective view of a further alternative single phase FCL arrangement.

Other prototype designs having irregular cross sections have been constructed and tested. FIG. 11 illustrates a further single phase dual core design 90. The dual core design includes one DC coil 91 for saturating the cores 92, 93. AC coils 100, 101 are wound around the steel cores and interconnected (not shown). Each core includes substantial end blocks of laminated steel 95-98 at each end. The arrangement of the laminated steel blocks is designed to approximate the design of FIG. 1.

Figure 12:
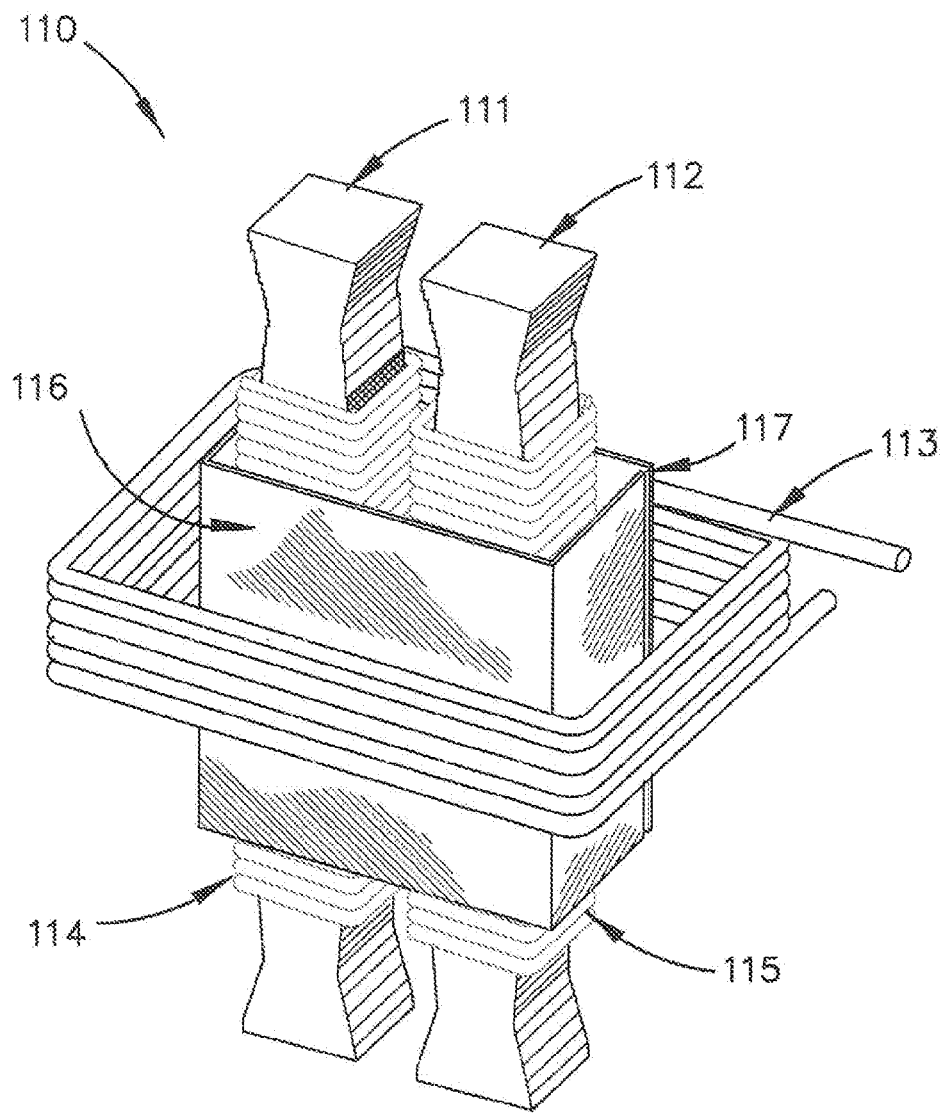
FIG. 12 is a side perspective view of an arrangement similar to FIG. 11 but with an additional shield.

FIG. 12 illustrates a further alternative arrangement 110. In this single phase arrangement, two profiled cores 111, 112 are again provided. A DC coil 113 acts to saturate the cores. AC coils 114, 115 are wound around the cores in the usual manner. Additionally a magnetic shield 116 is formed around the AC coils and the cores from an electrically conductive material. The magnetic shield 116 can also be of stainless steel or electrical grade copper and acts to advantageously modify the fault current behaviour and reduce the back EMF and current ripple into any DC biasing circuit employed. In some cases the shield can include a slot 117 to eliminate any transformer induced currents in the shield. In other embodiments, no cut is provided and the shield forms a complete electric circuit.

Figure 13:
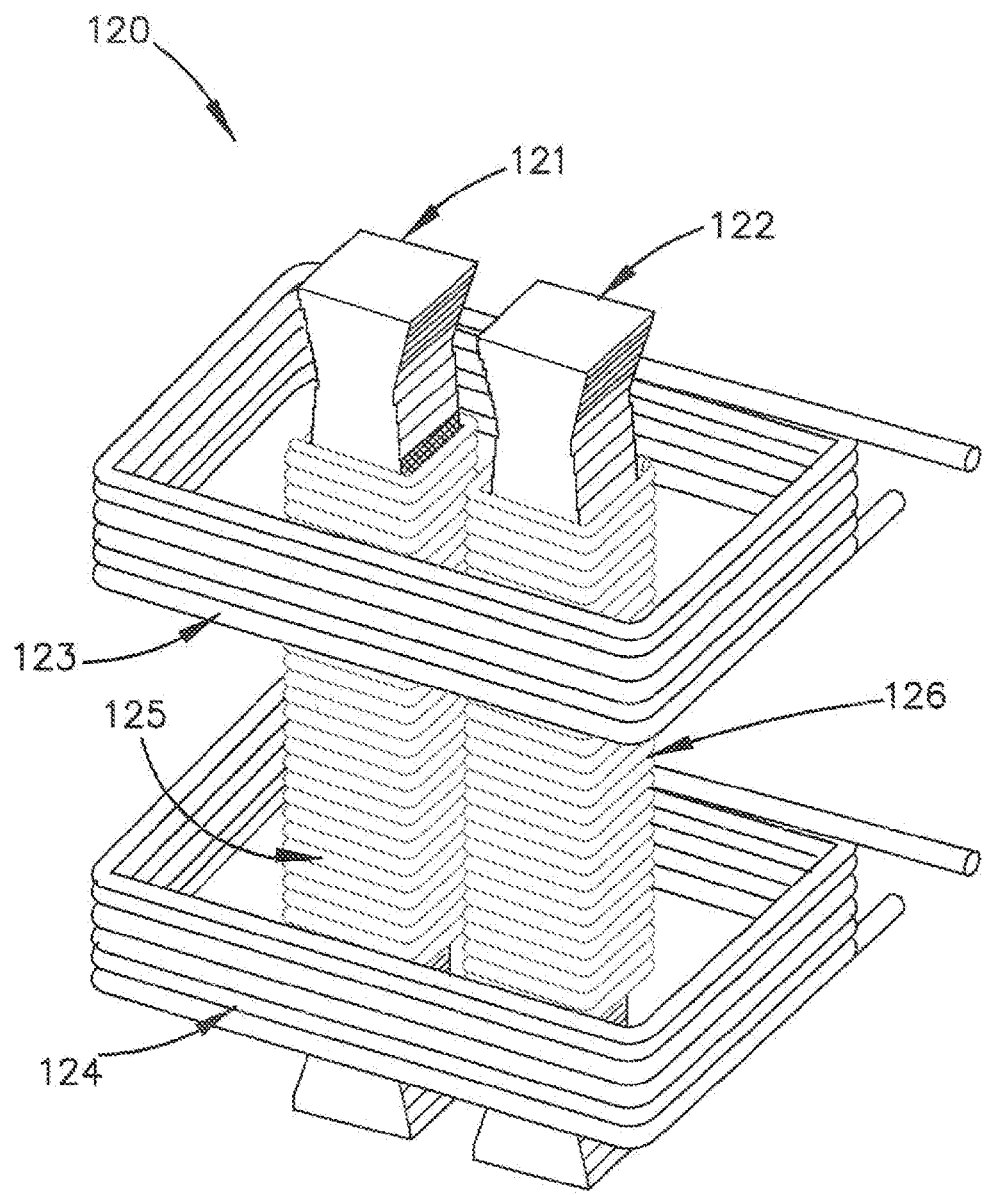
FIG. 13 is a side perspective view of a further alternative arrangement having two DC saturating coils.

FIG. 13 illustrates a further alternative arrangement 120. In this arrangement, two profiled cores are provided 121, 122, having AC coils wound around each core. Two DC coils 123, 124 are also provided for saturating the cores.

Figure 14:
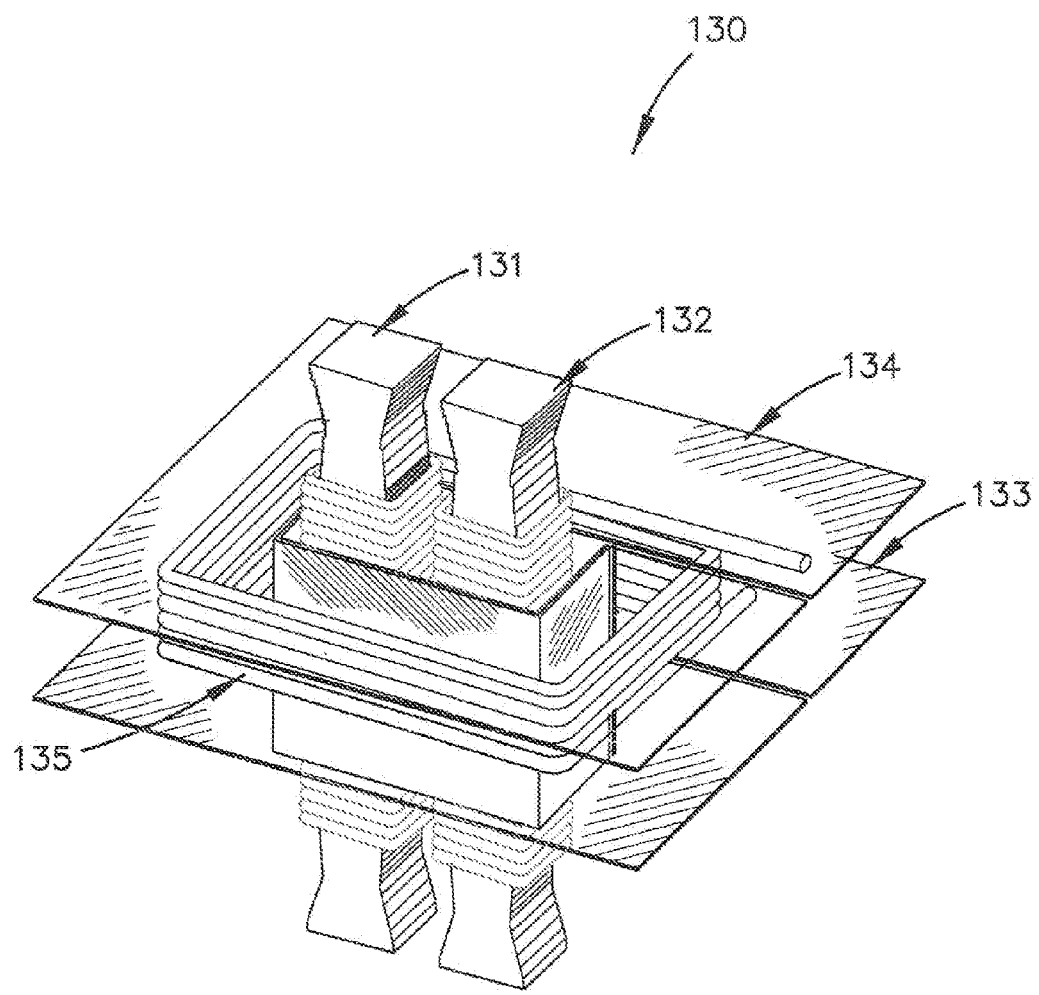
FIG. 14 illustrates a side perspective view of a further alternative FCL arrangement.

In FIG. 14, a further arrangement is provided 130. This arrangement is similar to that shown in FIG. 12, having two cores 131, 132 sounded by a DC saturating coil 135. Additionally, a set of flared magnetic shields made form an electrically conductive material 133, 134 are provided and act to advantageously modify the fault current behaviour and reduce the back EMF and current ripple into any DC biasing circuit employed during the fault current condition.

Figure 15:
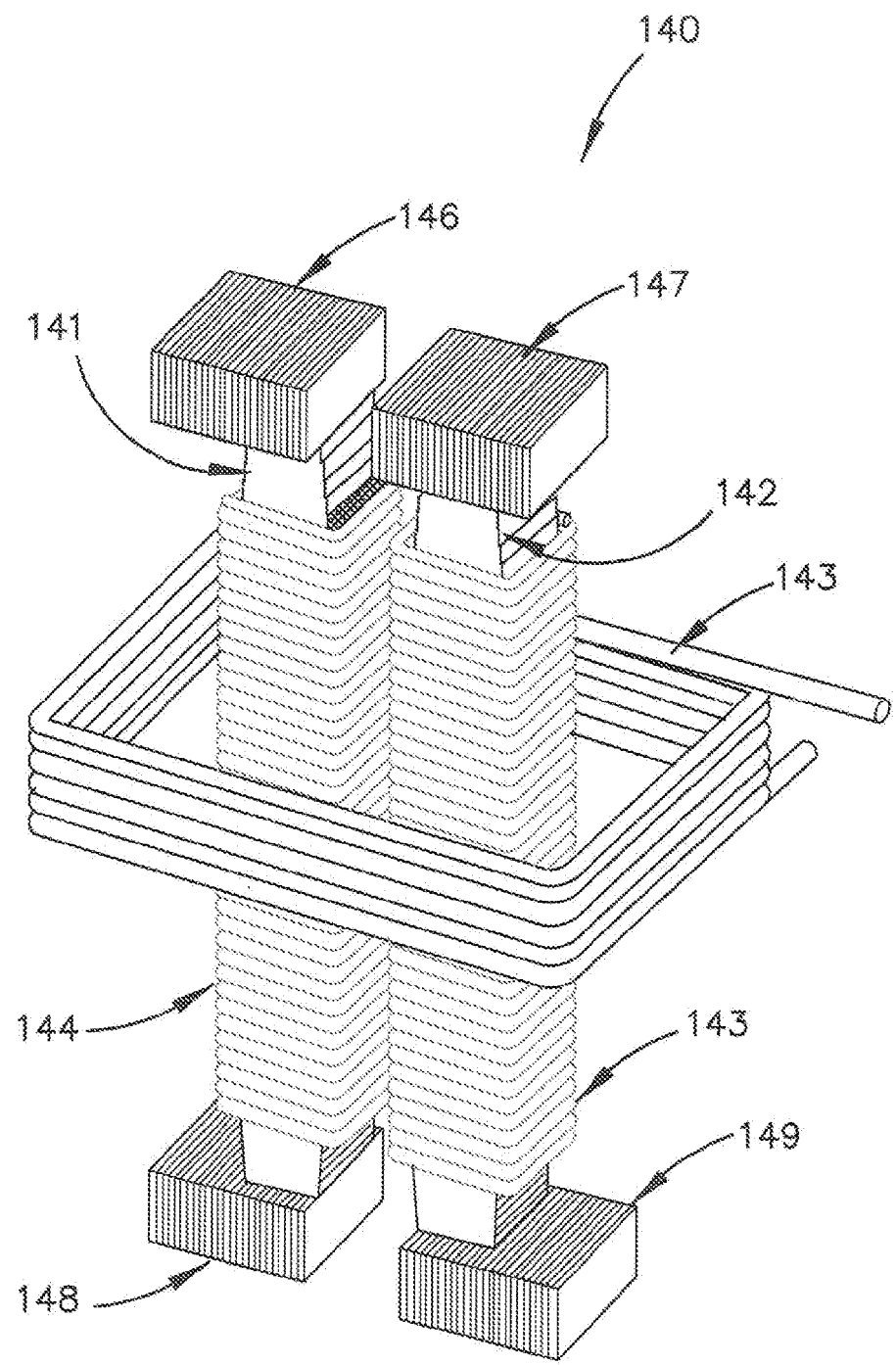
FIG. 15 illustrates a side perspective view of a further alternative FCL arrangement.

FIG. 15 shows a further alternative arrangement 140. In this single phase arrangement, the two cores 141, 142 are surrounded by AC coils 144, 145 and DC coil 143. In this arrangement a series of enlarged elongated laminated blocks constructed from a material with a high magnetic permeability are provided 146-149. The blocks 146-149 are more separated than those of FIG. 11 and act to advantageously modify the DC biasing characteristics and the fault current behaviour and to reduce the back EMF and current ripple induced into any DC biasing circuit employed during the fault current condition.

Figure 16:
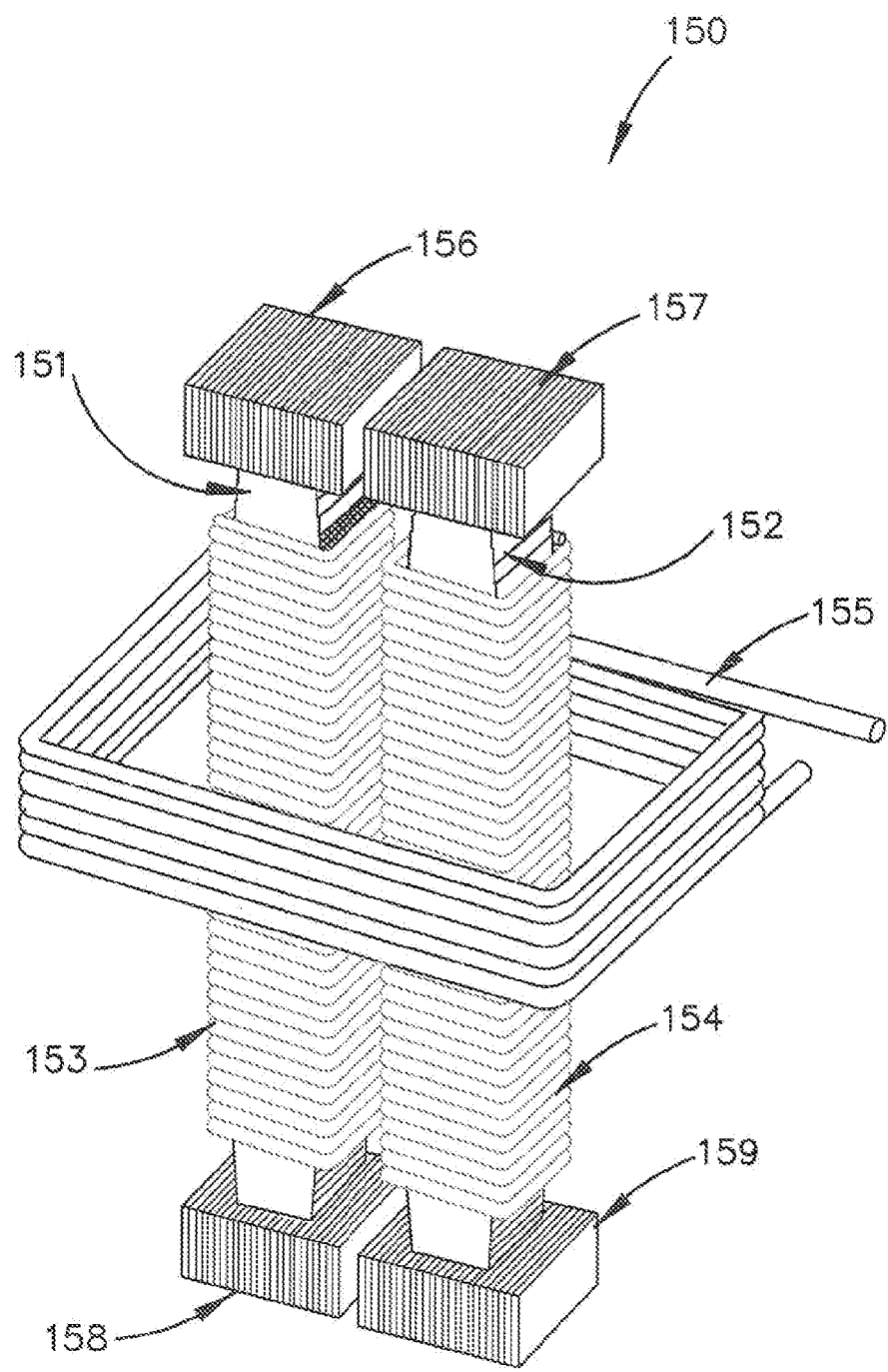
FIG. 16 illustrates a side perspective view of a further alternative FCL arrangement, similar to FIG. 15.

FIG. 16 illustrates a further alternative embodiment 150, having cores 151, 152 around which coils 153, 154 are wound. DC coil 155 is provided to saturate the core. Further, end blocks of laminated material with a high magnetic permeability 156-159 are also provided to optimise the saturation characteristics.

Figure 17:
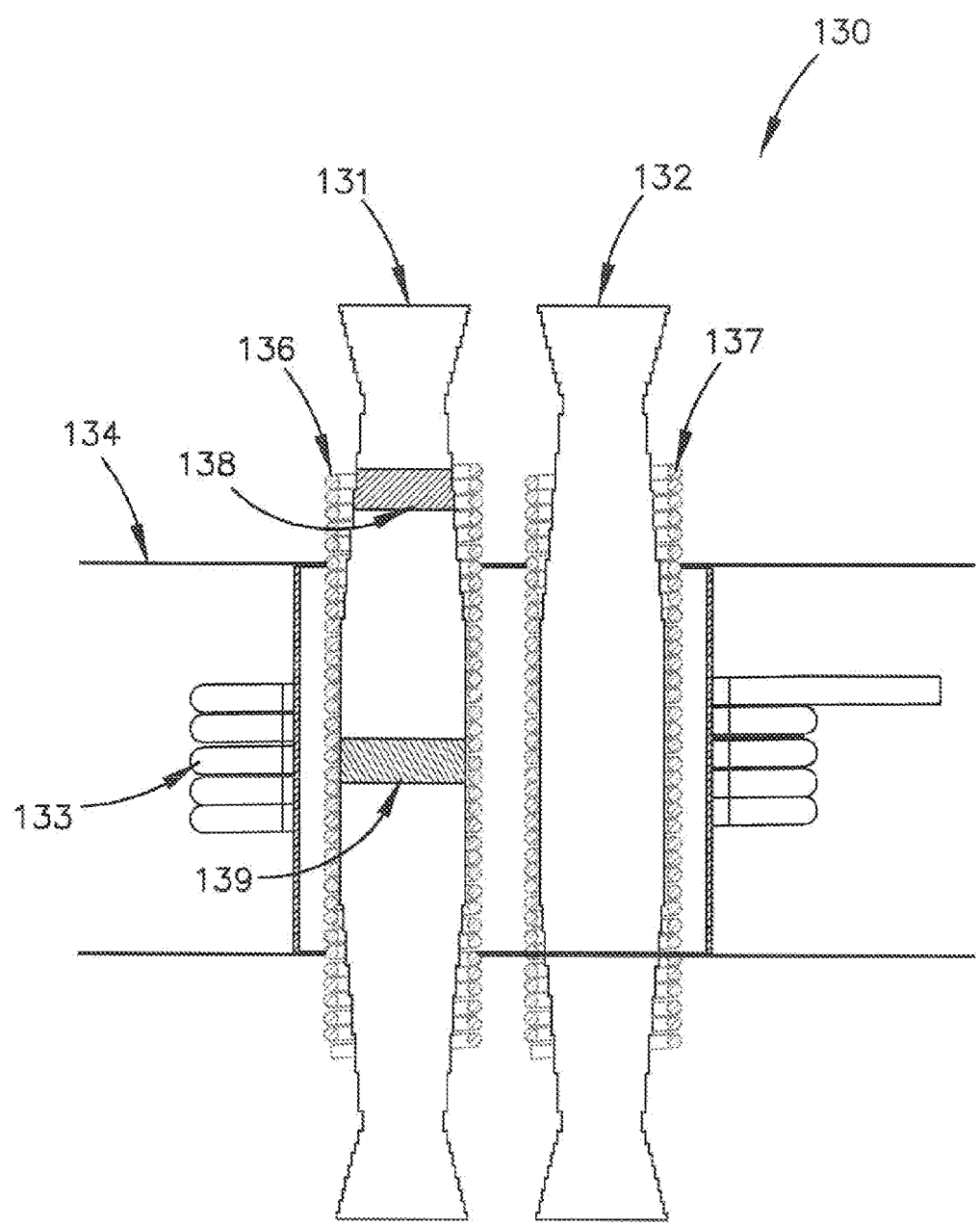
FIG. 17 illustrates a sectional view through the arrangement of FIG. 14.

FIG. 17 illustrates a sectional view thorough the arrangement 130 of FIG. 14. The core 131 includes two portions, one portion being centrally located and one portion located near the end of the cores and which are constructed from an alternative material, preferably a material with a high magnetic permeability or an air gap.

Experimental Results

By way of testing for the improved effectiveness of the profiled cores, three sets of different FCL pairs were examined. In each pair, one FCL was constructed using profiled cores and the other FCL was constructed using cores of uniform cross sectional area.

In a first experiment, two FCL's were built for the purpose of testing them side by side and comparing the fault current limiting functionality and DC biasing characteristics. The two FCL's were built with identical steel core material laminations, material type, and steel core heights. One FCL was built with tapered and flared steel cores of the type shown in FIG. 1, and one was built straight cores of uniform cross sectional area along the height. The details o these two FCL's are set out in the table below:

| Parameter | FCL design parameter using the "tapered and flared core" art | FCL design parameter using standard cores without tapering and flaring (employing steel cores with a constant cross sectional area) |
|---|---|---|
| Steel core material | M4 | M4 |
| Steel core material lamination thickness | 0.30 mm | 0.30 mm |
| core_d1 | 80 mm | 80 mm |
| core_d2 | 72 mm | Not applicable |
| core_d3 | 65 mm | Not applicable |
| core_d4 | 104 mm | Not applicable |
| core_h | 600 mm | 600 mm |
| core_h1 | 90 mm | Not applicable |
| core_h2 | 75 mm | Not applicable |
| core_h3 | 75 mm | Not applicable |
| core_h4 | 60 mm | Not applicable |
| DC_h | 233 mm | 233 |
| Number of DC coil turns in total | 196 | 196 |
| Number of DC coils | 1 | 1 |
| Location of DC coil | Central | Central |
| Inner DC coil dimensions | 380 mm × 255 mm | 380 mm × 255 mm |
| Outer DC coil dimensions | 580 mm × 455 mm | 580 mm × 455 mm |
| AC turns on each AC coil | 60 | 60 |
| Height of the AC coils | 390 mm | 390 mm |
| Test voltage | 312 V AC rms line to gnd | 312 V AC rms line to gnd |

Figure 18:
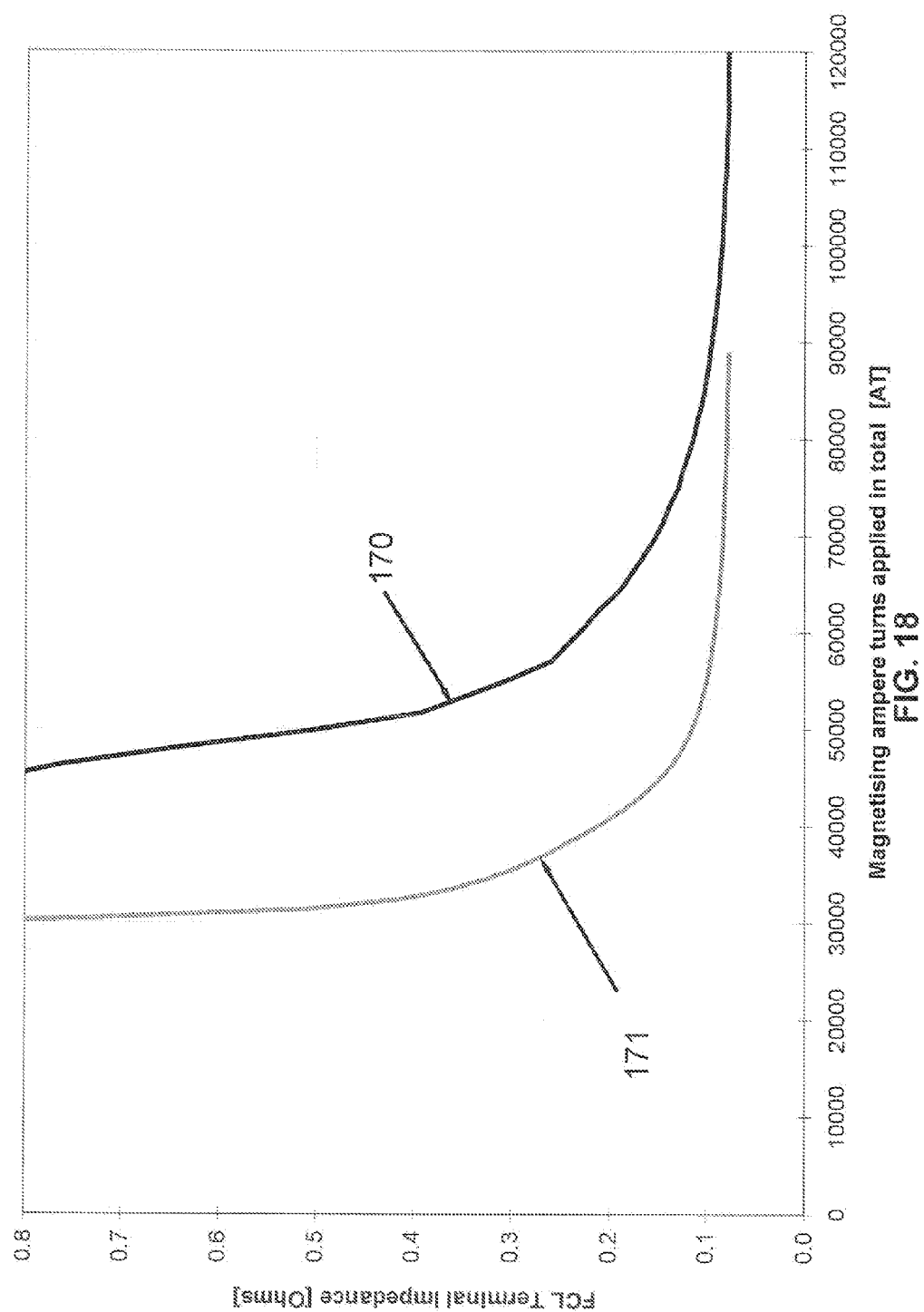
FIG. 18 is a graph comparing the impedance relative to ampere turns comparing two FCL devices.

FIG. 18 shows the measured results which compare the DC bias required for each of the FCL's tested. The DC bias required for the FCL with the uniform cross sectional area steel cores 170 was found to be 110 kAT while for the tapered core device 171 it was found to be 70 kAT. This represents a substantial saving in DC bias conductor for the tapered core device.

Figure 19:
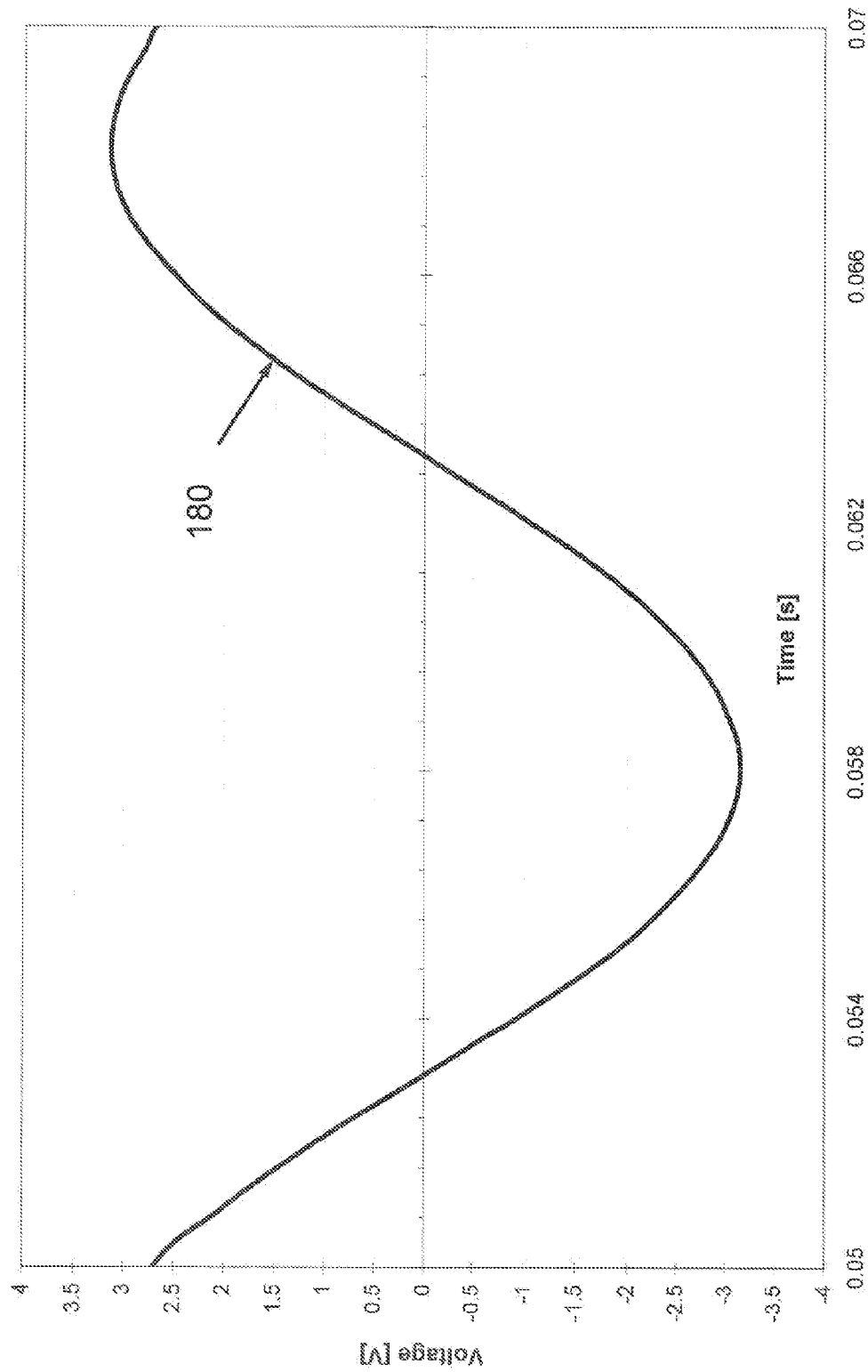
FIG. 19 shows the voltage across the devices of FIG. 18 in the un-faulted steady state condition.

FIG. 19 shows the voltage 180 across the tapered and flared core device in the steady un-faulted state. The rms value of this voltage waveform is 2.2 V rms which is consistent with the expected voltage of a fully saturated device of this design.

Figure 20:
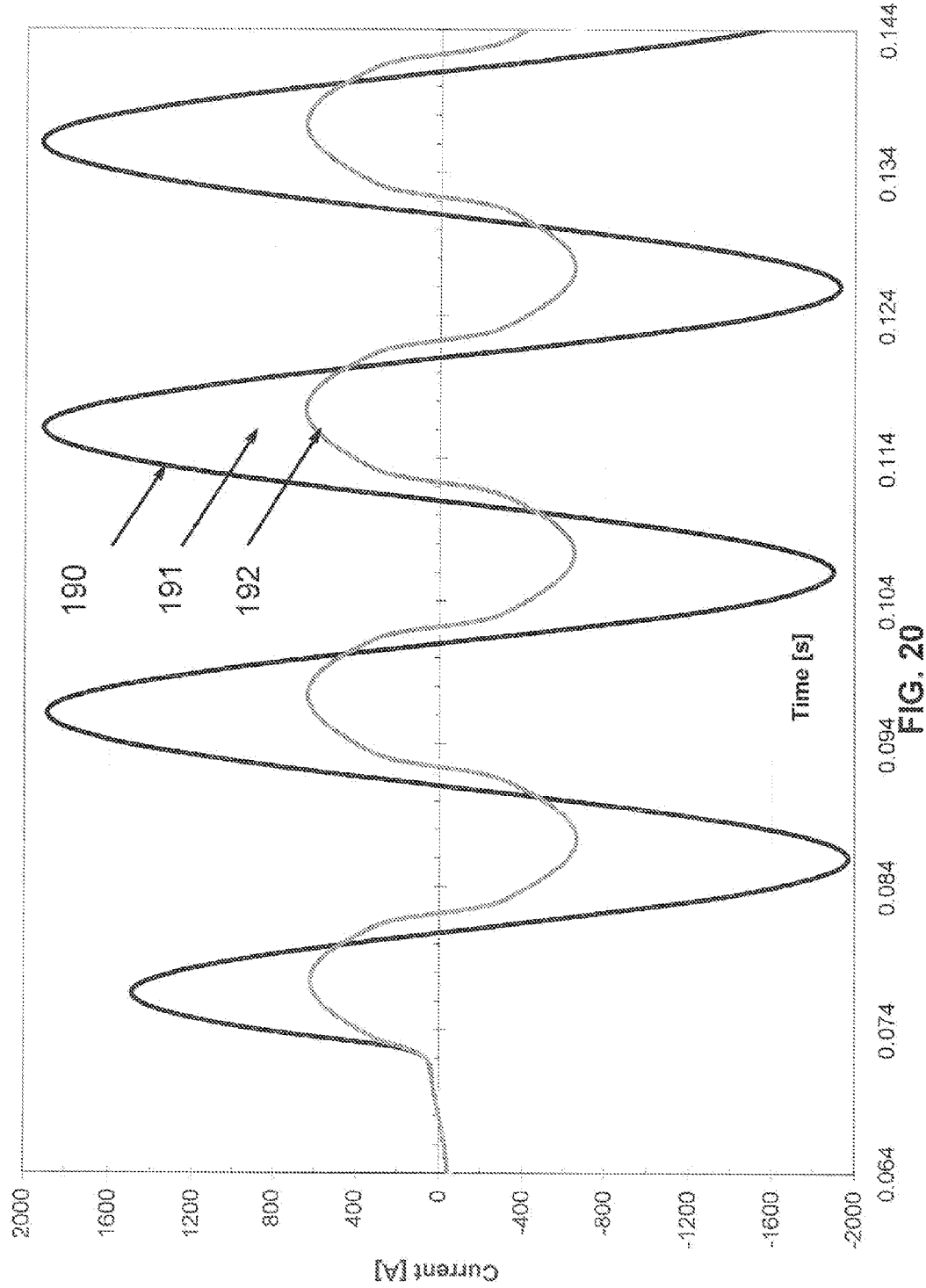
FIG. 20 illustrates a graph of the results of fault current tests.

FIG. 20 shows the results of the fault current tests. The prospective fault current 190 of 1350 Amps rms was found to be reduced to 652 Amps rms 191 by the straight core standard FCL and to 457 Amp rms 192 by the tapered and flared core FCL.

Figure 21:
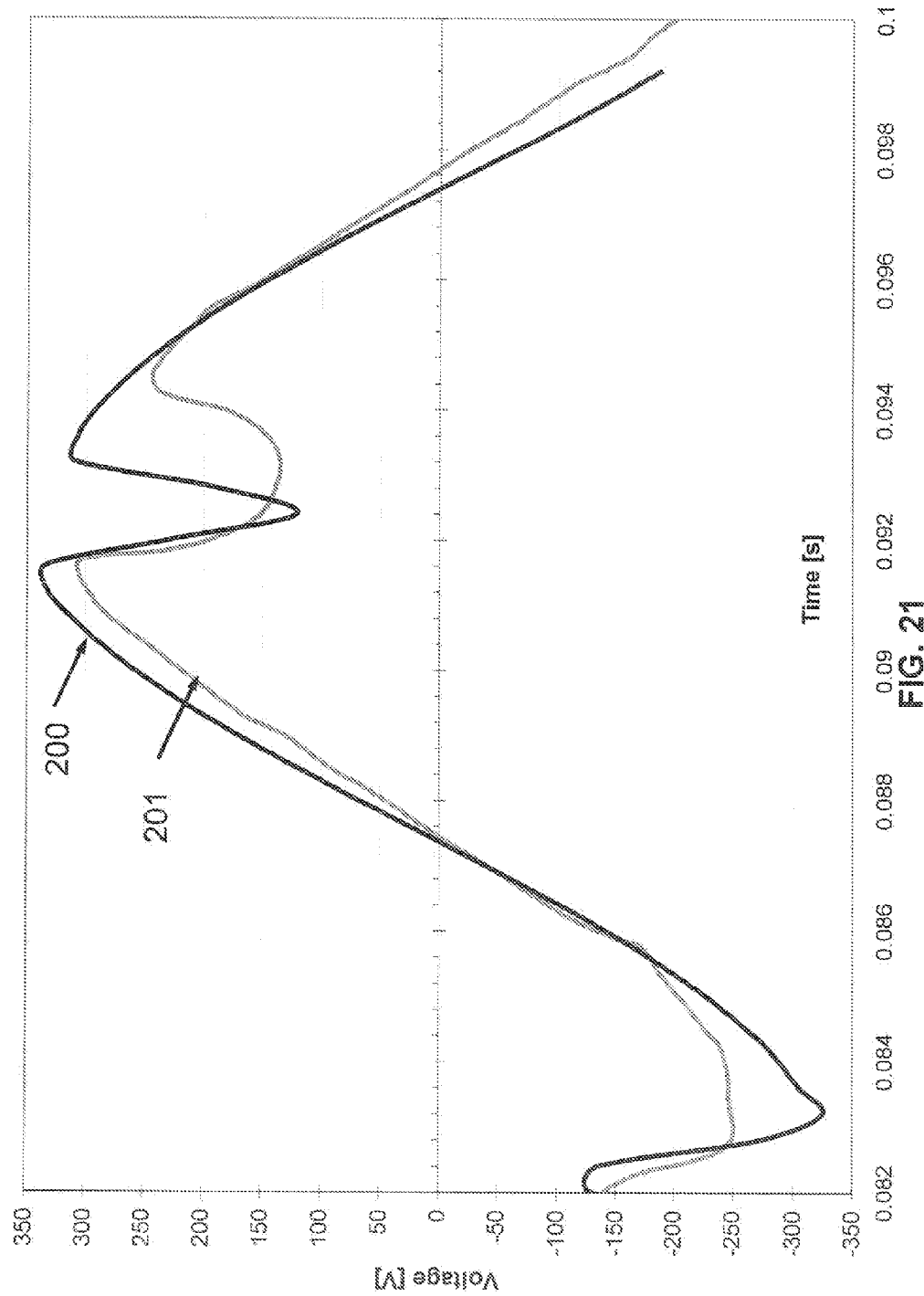
FIG. 21 is a graph illustrating the voltage across the FCL devices tested during the fault current condition.

FIG. 21 shows the back EMF developed across the two FCL's during the fault current event as a function of time. The voltage waveform developed across the tapered flared core FCL 200 has a greater magnitude in the interval of interest compared to the waveform developed from the standard straight core FCL 201 with a uniform cross sectional area. It will be appreciated by those skilled in the art that the tapering and flaring of the steel cores has made more effective use of the steel cores by enhancing the back EMF developed across the FCL during the fault event which has in turn lead to a greater degree of fault current limiting at a lower DC bias.

Figure 6:
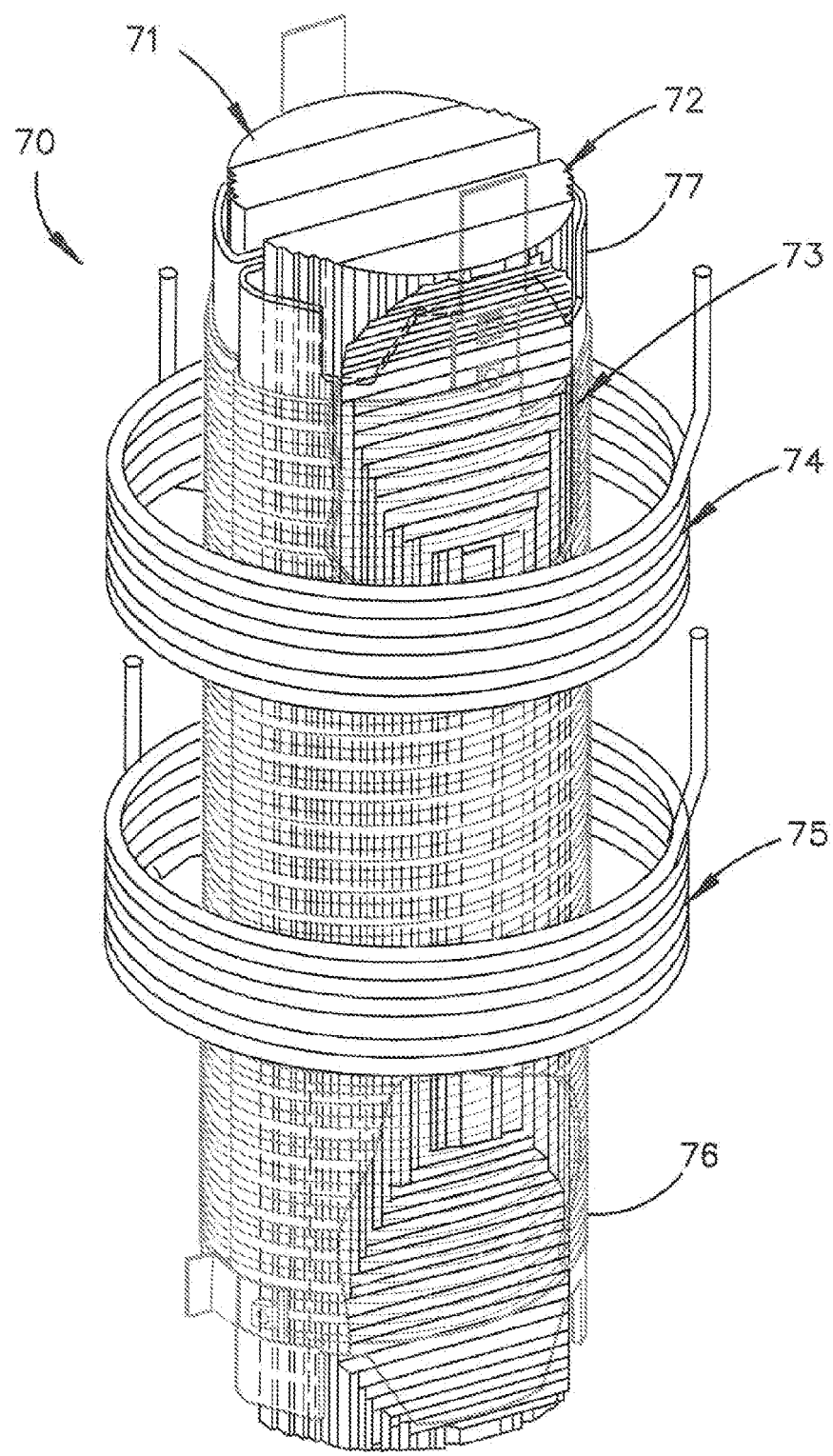
FIG. 6 illustrates a side perspective view of a further alternative single phase fault current limiter having 'D' shaped cores; arrangement.

In a second pair of devices, an FCL with laminated tapered and flared steel cores of the type shown in FIGS. 4, 5, and 6 was analysed, and an FCL without flared and tapered cores and employing steel cores of uniform cross sectional area was also designed with the same fault current limiting performance. The Table below sets out the dimensions of these two fault current limiters.

| Parameter | Value for 'tapered and flared' core FCL as per FIG. 6 | Value for 'straight core' FCL with uniform cross sectional area of steel core along the entire length of cores |
|---|---|---|
| Steel core material | M4 | M4 |
| Steel core material lamination thickness | 0.30 mm | 0.30 mm |
| Number of steel cores | 2 | 2 |
| Number of AC coils | 2 | 2 |
| Number of DC coils | 2 | 2 |
| core_h | 3000 | 4000 |
| core_h1 | 2000 | Not applicable |
| core_h2 | 600 | Not applicable |
| core_h3 | 400 | Not applicable |
| Acore | 0.25 | 0.22 |
| Ataper | 0.18 | 0.22 |
| Aflare | 0.26 | 0.22 |
| DC_h | 410 mm | 410 mm |
| DC coil Centre to Centre separation | 2250 mm | 3000 mm |
| Number of DC coil turns in total | 4000 | 4000 |
| Inner DC coil diameter | 1668 mm | 1668 mm |
| Outer DC coil diameter | 1700 mm | 1700 mm |
| Number of AC turns on each AC coil | 94 | 122 |
| Height of the AC coils | 2600 mm | 3100 mm |
| Test voltage (line to ground) | 80 kV AC rms | 80 kV AC rms |
| DC bias required | 710 kAT | 850 kAT |
| Prospective steady state fault current | 13,800 A rms | 13,800 A rms |
| Limited steady state fault current | 7,920 A rms | 7,920 A rms |

The two fault current limiters were designed so that they would each produce identical fault current limiting performances. It was found through this design exercise that the new art of tapering and flaring of the steel cores allows an FCL to be designed with significantly less steel and with a significantly shorter core. For this example, it was found that the height of the device could be reduced from 4000 mm to 3000 mm while not sacrificing any of the fault current limiting attributes. In addition, the number of AC turns on each steel core limb could be reduced from 122 turns to 94 turns which is a significant saving in the cost, mass, and electrical energy losses due to this part of the device. An additional benefit found was that the DC bias required to achieve this performance could be reduced from 850 kAT for the conventional device to 710 kAT when employing the new core tapering and flaring art disclosed here.

Figure 22:
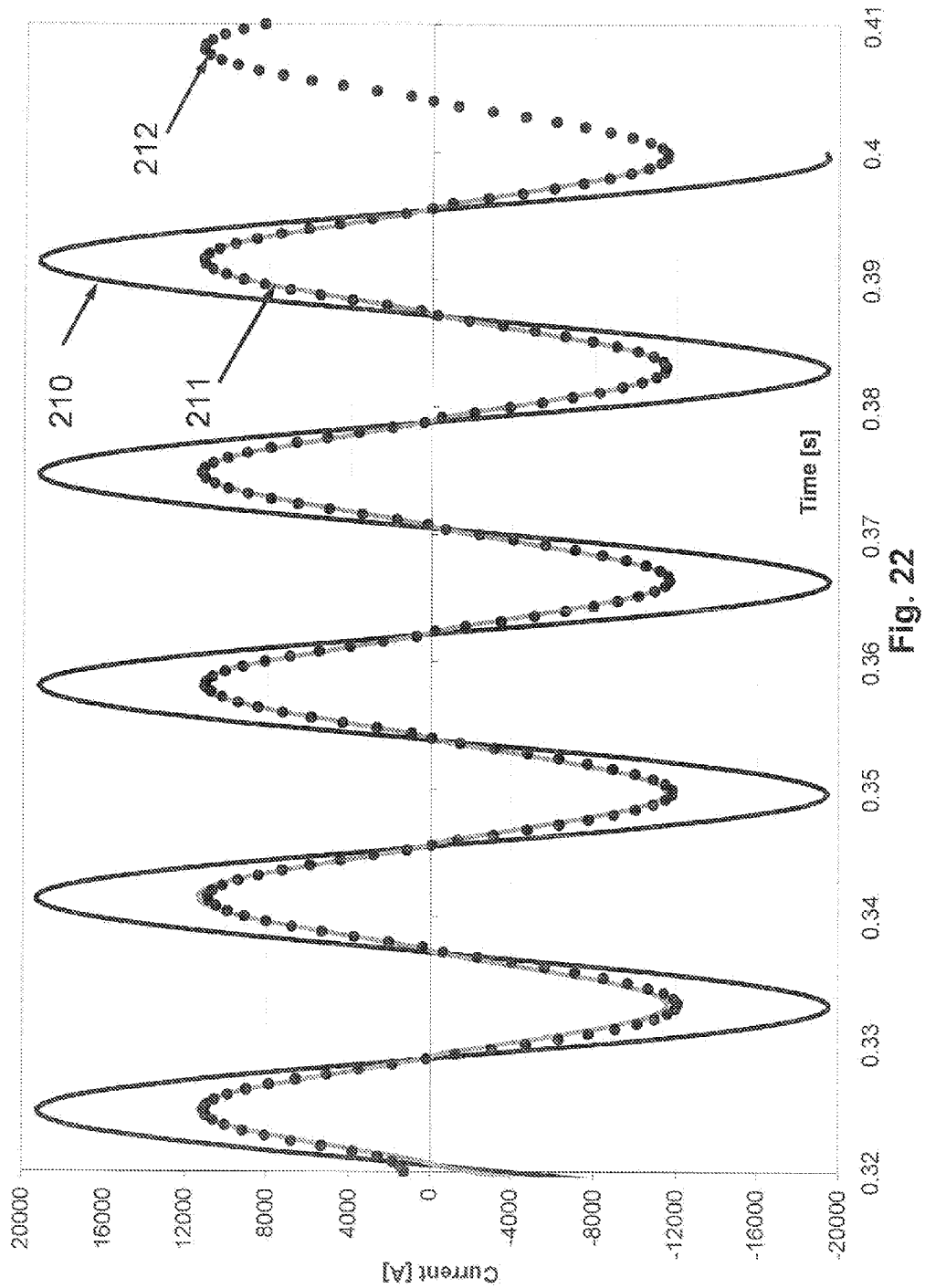
FIG. 22 illustrates a fault current across a second set of two tested FCL devices.
Figure 23:
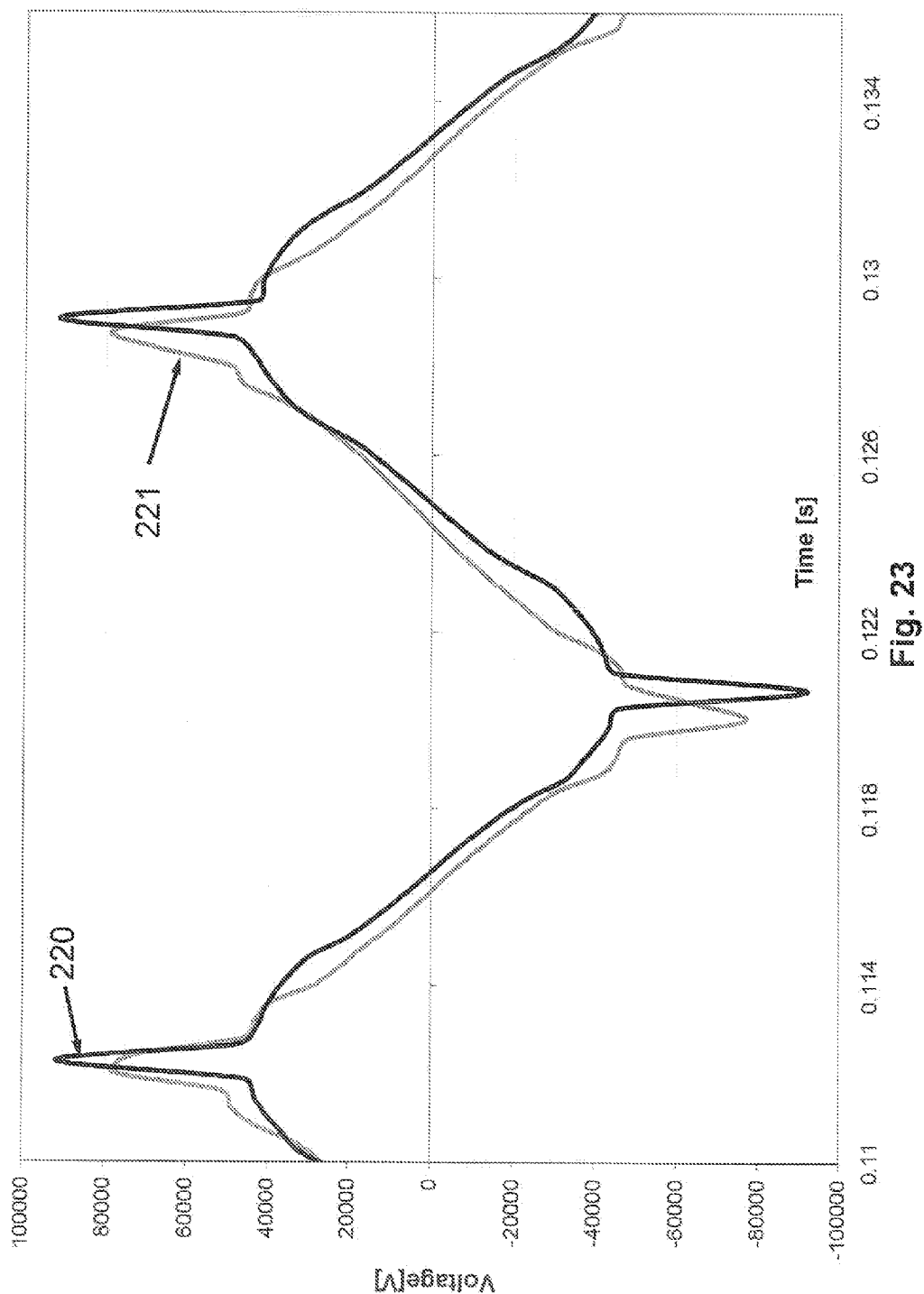
FIG. 23 illustrates the back EMF generated across the second set of two test FCL devices during the fault current state.

FIG. 22 illustrates the prospective fault current 210 and the limited fault current for the standard straight, uniform steel core design 211 and the new art presented here with a tapered and flared core design 212. FIG. 23 details the back EMF generated across the tapered and flared core device 220 and the standard uniform core device 221. It was found through this investigation that the tapered and flared core device was more effective at generating the required back EMF for fault current limiting and hence more efficient at reducing the fault current. This design required less steel and less AC turns to accomplish the same degree of fault current limiting as the FCL designed with steel cores of a uniform cross sectional area.

In a third pair of FCL devices, an FCL with laminated tapered and flared steel cores of the type shown in FIGS. 4, 5, and 6 was analysed with the cross sectional area of the flared portion significantly larger than the cross sectional area of the central steel core portion, and an FCL without flared and tapered cores and employing steel cores of uniform cross sectional area was also designed with the same performance as that of the flared and tapered FCL. The Table below discloses the dimensions of these two fault current limiters.

| Parameter | Value for 'tapered and flared' core FCL as per FIGS. 4, 5, and 6 | Value for 'straight core' FCL with uniform cross sectional area of steel core along the entire length of cores (prior art) |
|---|---|---|
| Steel core material | M4 | M4 |
| Steel core material lamination thickness | 0.30 mm | 0.30 mm |
| Number of steel cores | 2 | 2 |
| Number of AC coils | 2 | 2 |
| Number of DC coils | 2 | 2 |
| core_h | 1400 | 1800 |
| core_h1 | 350 | Not applicable |
| core_h2 | 210 | Not applicable |
| core_h3 | 140 | Not applicable |
| Acore | 0.038 | 0.038 |
| Ataper | 0.0275 | 0.038 |
| Aflare | 0.0413 | 0.038 |
| DC_h | 220 mm | 220 mm |
| Number of DC coil turns in total | 784 | 784 |
| Inner DC coil diameter | 700 mm | 700 mm |
| Outer DC coil diameter | 941 mm | 941 mm |
| Number of AC turns on each AC coil | 20 | 23 |
| Height of the AC coils | 1117 mm | 1457 mm |
| Test voltage (line to ground) | 1500 V AC rms | 1500 V AC rms |
| DC bias required | 195 kAT | 250 kAT |
| Steady state prospective fault current | 15,000 A rms | 15,000 A rms |
| Limited fault current | 8,200 A rms | 8,200 A rms |

The two FCL's were designed so that they would produce identical fault current limiting of a 15 kA steady state prospective fault current. It was found through this design exercise that the tapering and flaring of the steel cores allows an FCL to be designed with significantly less steel and a significantly shorter core. For this example, it was found that the steel core height of the device could be reduced from 1800 mm to 1400 mm while not sacrificing any of the fault current limiting attributes. In addition, the number of AC turns on each steel core limb could be reduced from 23 turns to 20 turns and the DC bias could be reduced from 250 kAT to 195 kAT. These three main benefits represent a significant saving in the cost, mass, and electrical energy losses compared to the FCL designed with the uniform steel core cross sectional area.

Figure 24:
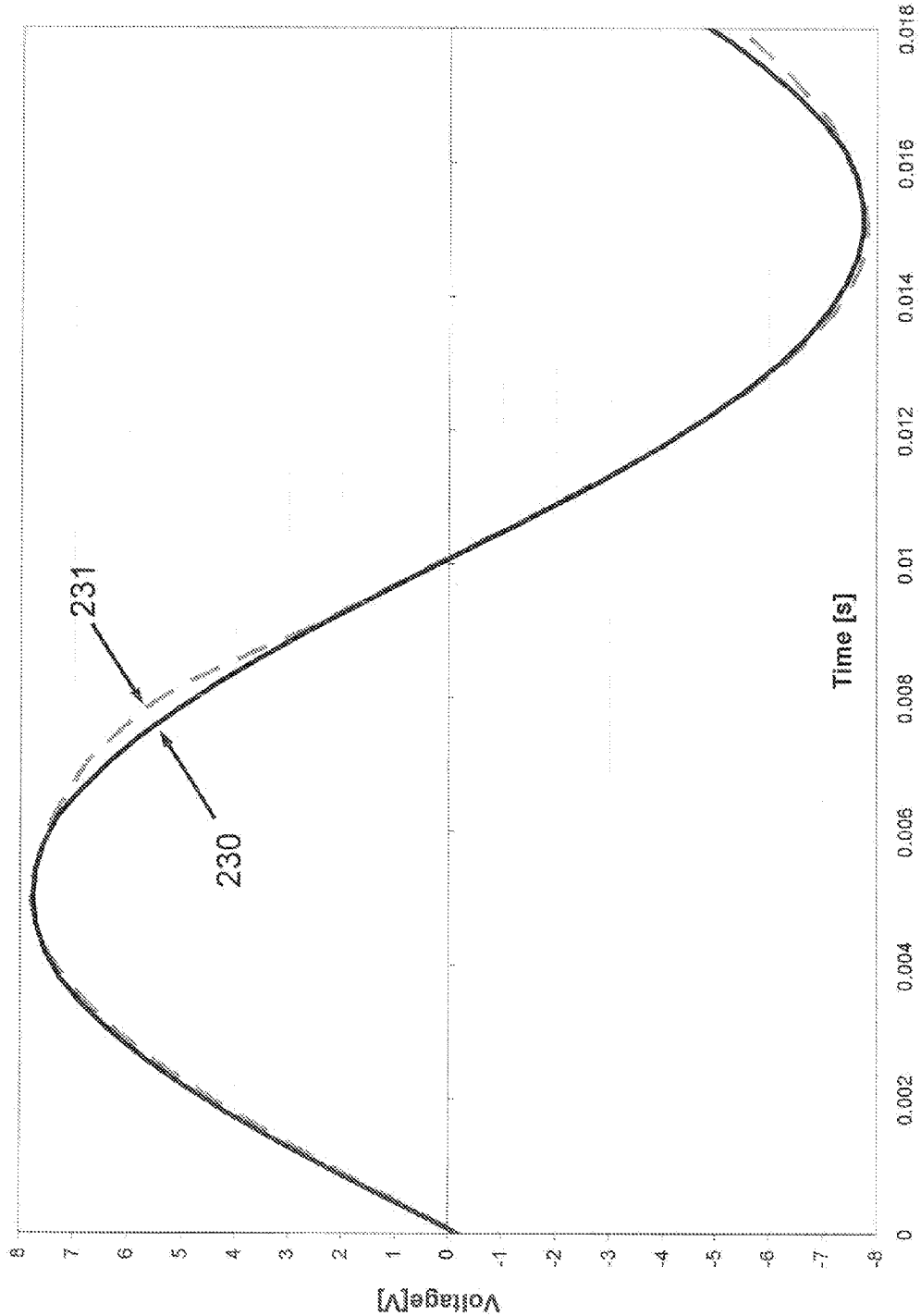
FIG. 24 illustrates the steady state voltage across a third set of tested FCL devices in the un-faulted steady state condition.

FIG. 24 shows the measured steady state voltage across both FCL's in this third pair as a function of time without a fault current and with 195 kAT of total ampere-turns biasing on the device with tapered and flared cores 230 and with 250 kAT of total biasing on the standard device 231. This illustrates that the tapered and flared steel core can be biased to the same impedance with 55 kAT fewer DC ampere-turns.

Figure 25:
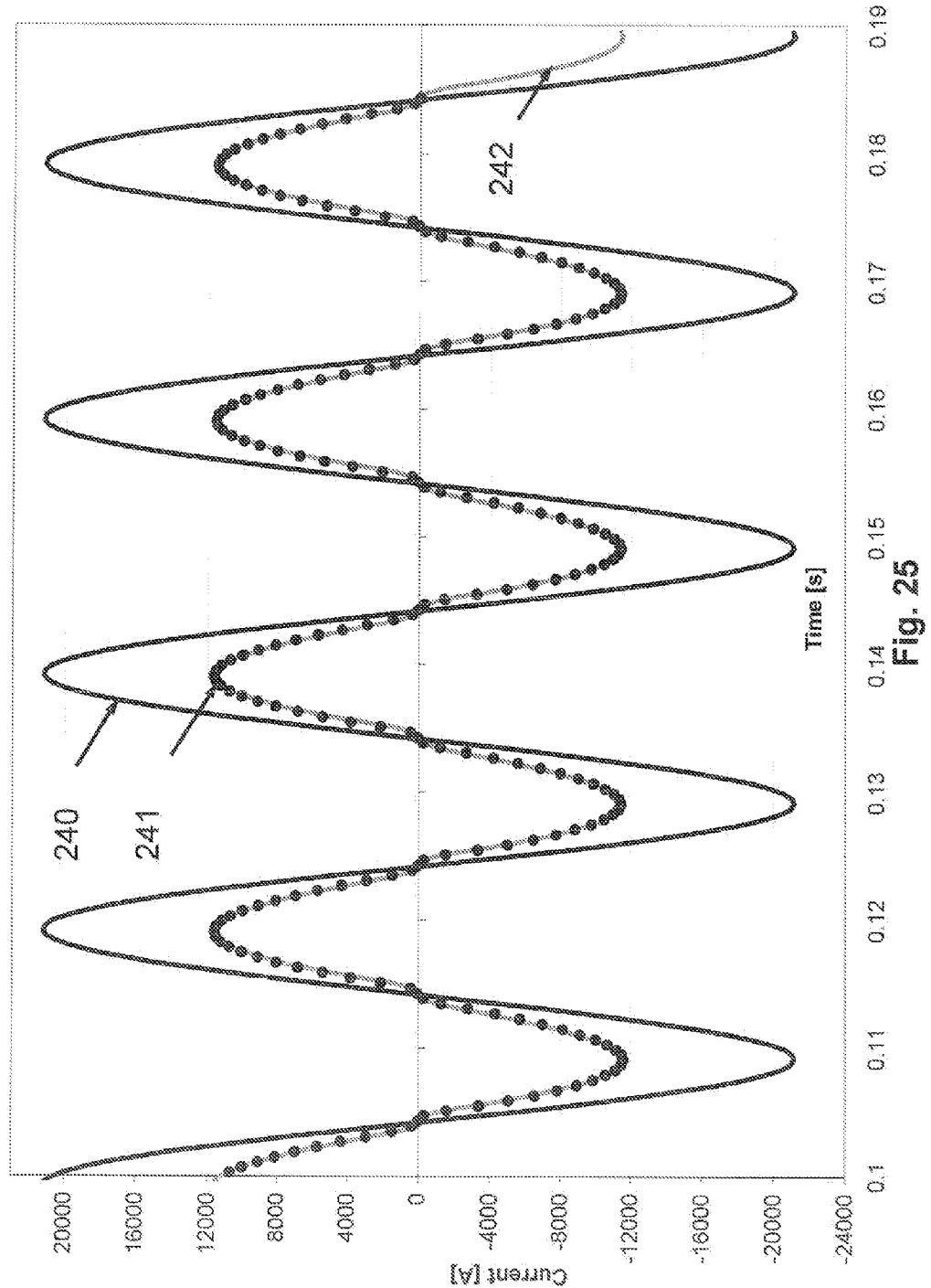
FIG. 25 illustrates a prospective fault current and limited fault current as a function of time for the third set of tested FCL devices.

FIG. 25 details the prospective fault current as a function of time 240 and the limited steady state fault current for the standard straight, uniform steel core design 241 and the limited steady state fault current for the tapered and flared core design 242. This data illustrates that the same degree of fault current limiting can be achieved in the design with the tapered and flared core and at a lower DC bias value.

Figure 26:
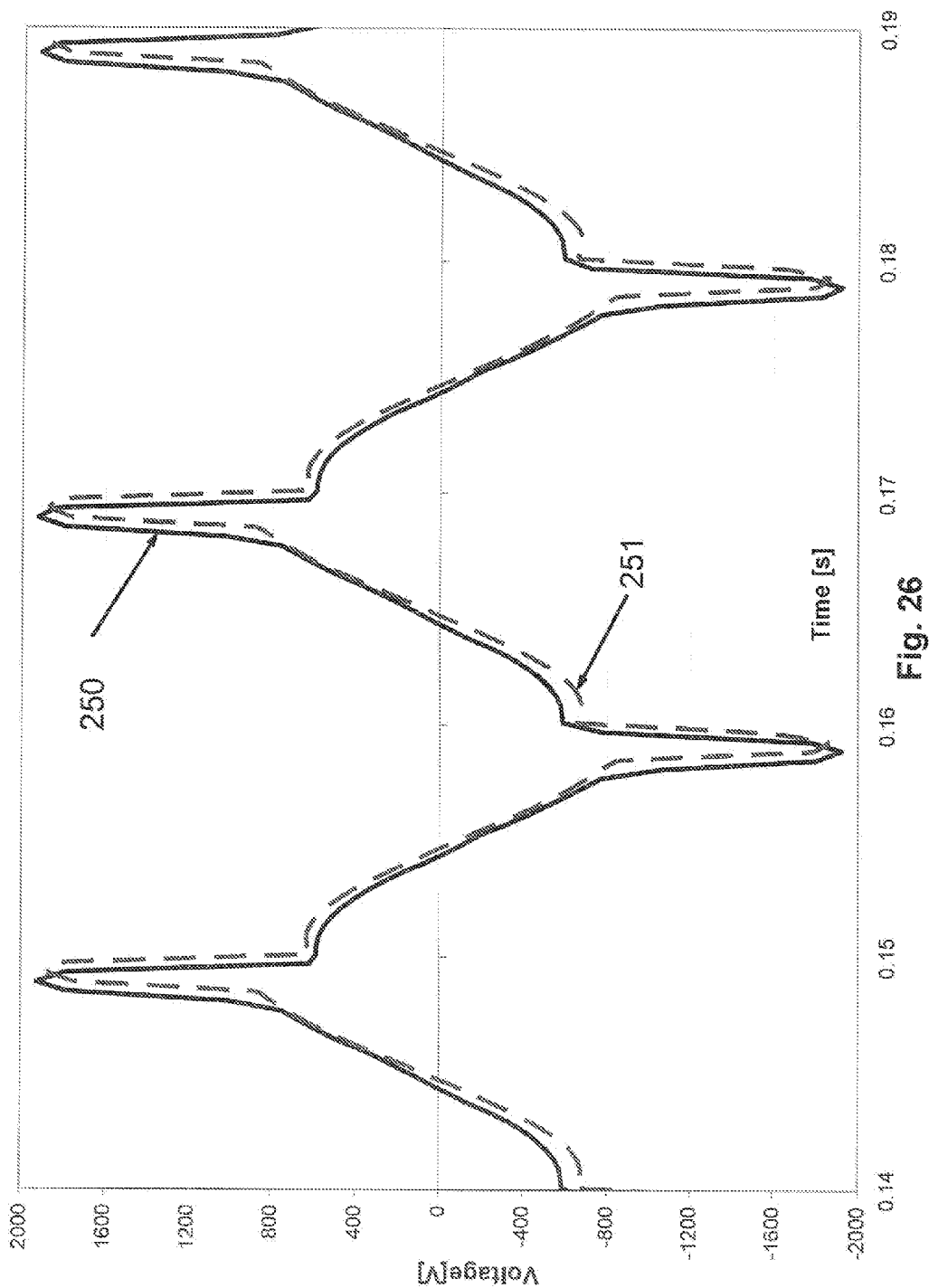
FIG. 26 illustrates the back EMF generated by the third set of tested FCL's during a fault.

FIG. 26 details the back EMF generated across the FCL's during the fault across the standard uniform core device 250 and the device with the tapered and flared cores 251. As can be appreciated by those skilled in the art, approximately the same back EMF is generated with the tapered and flared core device even though it has a lower number of AC turns and is shorter than the straight core equivalent.

It can therefore be seen that though optimization of the elongated core cross sectional structure, substantial benefits can be achieved. Tradeoff can include a reduction in saturation current, a reduction in size and a reduction in AC turns required.

Interpretation

The following description and figures make use of reference numerals to assist the addressee to understand the structure and function of the embodiments. Like reference numerals are used in different embodiments to designate features having the same or similar function and/or structure.

The drawings need to be viewed as a whole and together with the associated text in this specification. In particular, some of the drawings selectively omit including all features in all instances to provide greater clarity about the specific features being described. While this is done to assist the reader, it should not be taken that those features are not disclosed or are not required for the operation of the relevant embodiment.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The term "wound" as used herein relative to an element, unless otherwise specified, should not be interpreted as requiring the action of winding that element about an object. For example, when describing that a coil is "wound" about a core, the coil need not necessarily be formed about the core in a literal sense. That is, the term "wound" may be interpreted to literally require a coil to be physically wound around the core during the manufacturing process, or to be separately wound into a formed state and then placed about the core. It is more common for coils to be wound on a former to create a wound coil, and then have the wound coil placed around the core. Accordingly, the term "wound" as used herein should be interpreted as being analogous with the term "surrounding" or "extending about".

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used.

The invention claimed is:

1. A fault current limiter having a plurality of cores each one comprising an elongated portion biased magnetically towards saturation by means of a surrounding magnetic field created by at least one DC coil surrounding the cores, and a plurality of AC coils each surrounding the elongated portion of a respective core, the fault current limiter further including:

the elongated portion of the core having a variable cross section along the axis of the elongated portion of the core, in the vicinity of the AC coil, wherein the intensity of the magnetic field varies axially along the elongated portion of the core and said axially variable cross section is larger in the vicinity of the larger intensity of the magnetic field, the elongated portion of the core including an enlarged cross sectional area in a first region adjacent the DC coil, a reduced cross sectional area in a second region spaced apart from the DC coil and an enlarged cross sectional area in a third region at the ends of the elongated portion of the core, said variation in cross section aiding the operational characteristics of the fault current limiter and being optimized to reduce the surrounding magnetic field strength around the core required to induce saturation of the core.

2. A fault current limiter as claimed in claim 1 wherein said variable cross section provides for increased saturation of the core or reduces the magnetizing flux required to saturate or de-saturate the core.

3. A fault current limiter as claimed in claim 1 wherein two spaced apart DC coils surround the core, and the core includes a reduced cross sectional area in the region between the two spaced apart DC coils.

4. A fault current limiter as claimed in claim 1 wherein the limiter has two elongated cores per power phase, with each core spaced apart from one another and having a DC coil surrounding both cores of each phase.

5. A fault current limiter as claimed in claim 4 wherein the cores have substantially a D shaped cross section.

6. A fault current limiter as claimed in claim 4 wherein the number of phases is three and the number of cores is six, with the cores arranged in a substantially circular manner.

7. A fault current limiter as claimed in claim 1 wherein the enlarged cross section of the third region is formed from a separate core mass placed at the ends of the elongated cores.

8. A fault current limiter as claimed in claim 1 wherein the cores are formed from laminated material having a high magnetic permeability.

9. A fault current limiter as claimed in claim 8 wherein the high magnetic permeability material comprises substantially transformer steel.

10. A fault current limiter as claimed in claim 4 wherein a conductive shield is placed around the cores and the AC coil.

\* \* \* \* \*